(12) United States Patent
Sumiya et al.

(10) Patent No.: US 6,521,882 B1
(45) Date of Patent: Feb. 18, 2003

(54) OPTICAL SENSOR WITH DIRECTIVITY CONTROLLED

(75) Inventors: Kazuyoshi Sumiya, Hekinan (JP); Keiji Horiba, Aichi-ken (JP); Masaki Takashima, Kariya (JP); Inao Toyoda, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/522,604

(22) Filed: Mar. 10, 2000

Related U.S. Application Data

(63) Continuation-in-part of application No. 09/277,068, filed on Jan. 5, 1999, now Pat. No. 6,261,946.

(30) Foreign Application Priority Data

| Mar. 27, 1998 | (JP) | 10-81753 |
| Mar. 3, 1999 | (JP) | 11-55251 |
| Mar. 12, 1999 | (JP) | 11-066465 |

(51) Int. Cl.⁷ .......................... G01J 1/42; G01C 21/02
(52) U.S. Cl. ............... 250/208.2; 250/208.6; 250/203.4; 356/139.01
(58) Field of Search ............ 250/208.2, 208.6, 250/203.4, 203.3; 126/572, 573; 356/139.01; 315/82

(56) References Cited

U.S. PATENT DOCUMENTS

| 4,236,099 A | * 11/1980 | Rosenblum | 315/83 |
| 4,933,550 A | 6/1990 | Hegyi | 250/237 |
| 5,022,725 A | 6/1991 | Matsunami et al. | 350/1.4 |
| 5,432,599 A | 7/1995 | Orii et al. | 356/218 |
| 5,594,236 A | 1/1997 | Suzuki et al. | 250/214.1 |
| 5,602,384 A | 2/1997 | Nunogaki et al. | 250/203.4 |
| 5,693,934 A | 12/1997 | Hohmoto et al. | 250/214 |
| 6,274,862 B1 | * 8/2001 | Rieger | 250/216 |

FOREIGN PATENT DOCUMENTS

| EP | 0 809 092 A2 | 11/1997 |
| JP | 6-43028 | 2/1994 |
| JP | 10-38683 | 2/1998 |

\* cited by examiner

*Primary Examiner*—Stephone Allen
*Assistant Examiner*—Eric Spears
(74) *Attorney, Agent, or Firm*—Harness, Dickey & Pierce, PLC

(57) ABSTRACT

Plural photodetectors for receiving light and generating detection signals. A light amount controlling portion is arranged above the photodetectors for controlling an amount of the light to the photodetectors according to an incident angle. A weighting portion for weighting sensitivities of the photodetectors respectively. The sensitivities are weighted to provide a total output characteristic of the weighted detection signals of which magnitude varies according to the incident angle. Weighting is provided by a signal processing circuit by controlling gains, or a translucent film on the photodetectors for controlling transparencies portions above respective photodetectors, or opaque films on the photodetectors for controlling amounts of the light to respective photodetectors. A first function signal may be obtained from a part of photodetectors for an air conditioner and a second function signal may be obtained from all of photodetectors for head lamp on/off controlling. Each coaxially arranged photodetector is divided to provide a semicircle or a semi-ring shape arranged with respect to the front direction of the vehicle to provide orientation angle data to control the air conditioner.

27 Claims, 28 Drawing Sheets

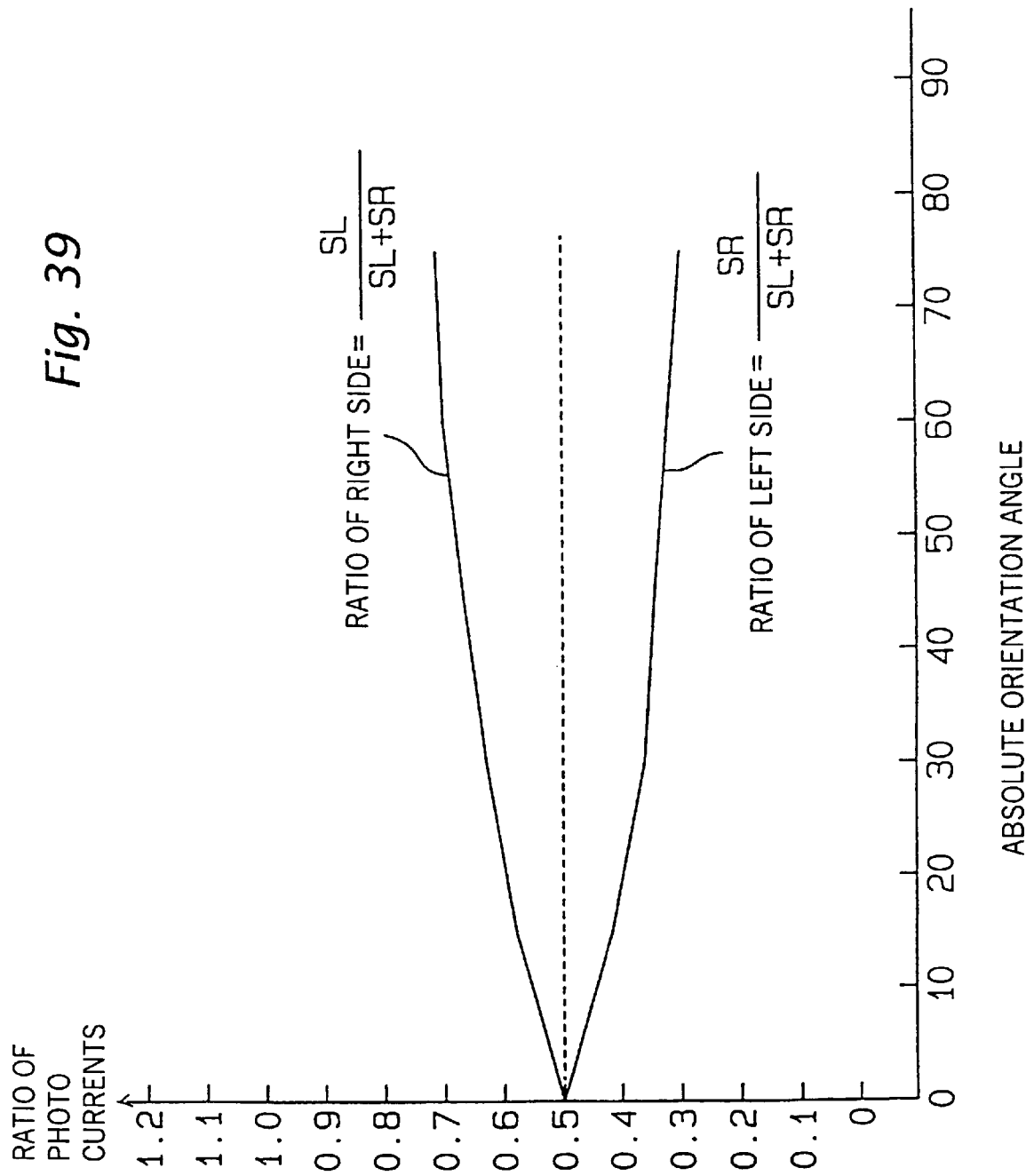

OPTICAL SENSOR WITH DIRECTIVITY CONTROLLED

This is a continuation-in-part of application Ser. No. 09/277,068, filed Jan. 5, 1999, now U.S. Pat. No. 6,261,946.

BACKGROUND OF THE INVENTION

1. Field of the Invention

This invention relates to an optical sensor for detecting light and generating a detection signal.

2. Description of the Prior Art

An optical sensor having a lens for receiving light and a photodetector for generating a light intensity signal in response to the received light is known. U.S. Pat. No. 5,432,599 discloses a temperature control system having a light intensity detection device for providing temperature compensation in accordance with the variation in angle of incident sunlight. U.S. Pat. No. 5,022,725 discloses an optical sensor including a light detector, a converging lens located between the light detector and a light source, the light rays from which are detected by the light detector, and a light shielding unit provided on a part of the converging lens. U.S. Pat. No. 4,933,550 discloses a photodetector system for producing electrical signals responsive to the orientation of a light source, such as the sun, with respect thereto utilizes a diffuser to eliminate position-dependent sensitivities of the photocathod. Moreover, U.S. Pat. No. 5,693,934 discloses a luminance detecting circuit in which plural photoinduced currents are amplified and combined onto a common current conductor, wherein the current amplifiers are turned on or off by control signals and therefore the luminance detecting circuit amplifies the current of the required photo detecting element only.

SUMMARY OF THE INVENTION

The aim of the present invention is to provide a superior optical sensor.

According to the present invention there is provided a first optical sensor including: an optical detecting unit including a plurality of photodetectors for receiving light and generating detection signals; a light amount controlling unit arranged above the optical detecting unit for controlling amounts of the light to the photodetectors in accordance with an incident angle of the light; and an weighting portion for respectively weighting sensitivities of the photodetectors and outputting an weighted detection signal from the detection signals, wherein a characteristic of the weighted detection signal varies in accordance with the incident angle, in order to obtain a desired directivity regarding incident angle (elevation angle).

In this first optical sensor, the weighting portion may include a signal processing circuit for controlling gains of the detection signals in order to obtain a desired directivity regarding incident angle (elevation angle).

In this first optical sensor, opaque films may be provided on the optical detection unit for controlling amounts of the light to respective photodetectors by controlling ratios between existence and inexistence of the opaque films per a unit area above respective photodetectors.

In this first optical sensor, a translucent film for controlling the light transmittance by controlling thicknesses of the portions of the translucent film above respective photodetectors may be provided.

In this first optical sensor, the light amount controlling unit may include a meniscus lens.

In this first optical sensor, the photodetectors may have different output characteristics respectively in response to the same amount of the light.

In this first optical sensor, the photodetectors are arranged coaxially as a second optical sensor.

In the second optical sensor, an outputting circuit for outputting one of the detection signals from one of the photodetectors arranged near the center of the photodetectors as a first sunlight amount detection signal indicative of a first amount of the light having a first directivity may be further provided, wherein the weighting portion includes a signal processing circuit for controlling gains of the detection signals and outputting a second sunlight amount signal indicative of a second amount of the light having a second directivity.

In the second optical sensor, one of the photodetectors arranged near the center of the photodetectors may be apart from the other photodetectors by a predetermined interval and the weighting portion includes a signal processing circuit arranged between one of the photodetectors and the other photodetectors.

In the second optical sensor, the light amount controlling unit controls the amounts of the light to the photodetectors such that the detection signals from the other photodetectors show a first set of magnitudes when the incident angle is substantially zero and show a second set of magnitudes when the incident angle is apart from zero which are respectively lower than the first sets of magnitudes.

In the second optical sensor, the light amount controlling unit has a shade for shading a portion of the light to the other photodetectors when the incident angle is substantially zero.

In the first optical sensor, the detection signals of a plurality of the photodetectors are summed to generate a first function signal and are combined to provide a second function signal. The first function signal is provided to control an air conditioner of a vehicle on which the optical sensor is mounted. The second function signal is provided to control turning on and off of a head lamp unit of the vehicle.

In this case, the first function signal is obtained by using a part of a plurality of the photodetectors and the second function signal is obtained by using all of a plurality of the photodetectors. Moreover, the optical sensor may further comprise a semiconductor chip including a plurality of the photodetectors which are coaxially arranged with each other. The first function signal is obtained from first one of the photodetectors arranged at a center of the photodetectors. Second one of the photodetectors arranged at the most outer peripheral position of the photodetectors and the second function signal is obtained from all of a plurality of the photodetectors.

In the second optical sensor, the detection signals of a plurality of the photodetectors are summed to generate a first function signal and are combined to provide a second function signal, and the first function signal is provided to control an air conditioner of a vehicle mounting the optical sensor. The second function signal is provided to control turning on and off of a head lamp unit of the vehicle.

In this case, the first function signal is obtained by using a part of a plurality of the photodetectors and the second function signal is obtained by using all of a plurality of the photodetectors.

Moreover, the optical sensor further comprises a semiconductor chip including a plurality of the photodetectors. The first function signal is obtained from first one of the photodetectors arranged at a center of the photodetectors and second one of the photodetectors arranged at the most outer peripheral position of the photodetectors. The second function signal is obtained from all of a plurality of the photodetectors.

According to the present invention there is provided a third optical sensor including: an optical detecting unit including a plurality of photodetectors for receiving light and generating detection signals; a light amount controlling unit arranged above the optical sensor for controlling amounts of the light to the photodetectors in accordance with an incident angle of the light; and a signal generation circuit for generating a first function signal regarding at least an incident angle of the light from one part of a plurality of the photodetectors and generating a second function signal regarding a total amount of the light from another part of photodetectors including the one part of a plurality of the photodetectors. The detection signals of a plurality of the photodetectors are summed to generate the first function signal and are combined to provide the second function signal. The first function signal is provided to control an air conditioner of a vehicle on which the optical sensor is mounted. The second function signal is provided to control turning on and off of a head lamp unit of the vehicle. The first function signal is obtained by using a part of a plurality of the photodetectors and the second function signal is obtained by using all of a plurality of the photodetectors.

In the third optical sensor, the optical sensor further includes a semiconductor chip including a plurality of the photodetectors which are coaxially arranged with each other. The first function signal is obtained from first one of the photodetectors arranged at a center of the photodetectors and a second one of the photodetectors arranged at the most outer peripheral position of the photodetectors. The second function signal is obtained from all of a plurality of the photodetectors.

In this case, the optical sensor further comprises a weighting portion for respectively weighting sensitivities of the photodetectors and outputting a weighted detection signal from the detection signals. A characteristic of the weighted detection signal varies in accordance with the incident angle. The weighting portion comprises a signal processing circuit for controlling gains of the detection signals.

According to the present invention there is provided a fourth optical sensor including: an optical detecting unit including a plurality of photodetectors for receiving light and generating detection signals; a light amount controlling unit arranged above the optical detecting unit for controlling amounts of the light to the photodetectors in accordance with an incident elevation angle of the light; a first signal generation circuit for generating and outputting a first sensor signal including data of an incident elevation angle of the light from a part of the detection signals; and a second signal generation circuit for generating and outputting a second sensor signal including data of a total amount of the light from the detection signals.

In the fourth optical sensor, the photodetectors are arranged coaxially.

In the fourth optical sensor, the photodetectors includes a first pair of photodetectors as first right and left photodetectors having a semi-circle shape. A second pair of photodetectors as second right and left photodetectors having a first ring shape. A third pair of photodetectors as third right and left photodetectors having a second semi-ring shape. The first to third right photodetectors are arranged symmetrically with the first to third left photodetectors regarding a direction on a plane on which the photodetectors are arranged. The first signal generation circuit includes a first circuit for generating a right side direction sensor signal from at least one of the first to third right photodetectors and a second circuit for generating a left side direction sensor signal from at least one of the first to third left photodetectors. The second signal generation circuit generates the second sensor signal from the first to third pairs of photodetectors.

In this case, the second left and right photodetectors are physically connected.

Moreover, a weighting unit for respectively weighting the first and second sensor signals and outputting first and second weighted detection signals may be further provided. Characteristics of the first and second weighted sensor signals vary in accordance with the incident elevation angle.

Moreover, the light amount control unit includes a first opaque ring arranged just above peripheral portions of the first pair of photodetectors to prevent the light from entering the first pair of photodetectors at a right elevation angle and a second opaque ring arranged just above the third pair of photodetectors to prevent the light from entering the third pair of photodetectors at a elevation angle.

BRIEF DESCRIPTION OF THE DRAWINGS

The object and features of the present invention will become more readily apparent from the following detailed description taken in conjunction with the accompanying drawings in which:

FIG. 39 is a graphical drawing of the fourth embodiment showing an incident orientation angle characteristic of the photocurrents with respect to the absolute orientation angle.

The same or corresponding elements or parts are designated with like references throughout the drawings.

DETAILED DESCRIPTION OF THE INVENTION

First Embodiment

Figure 27:
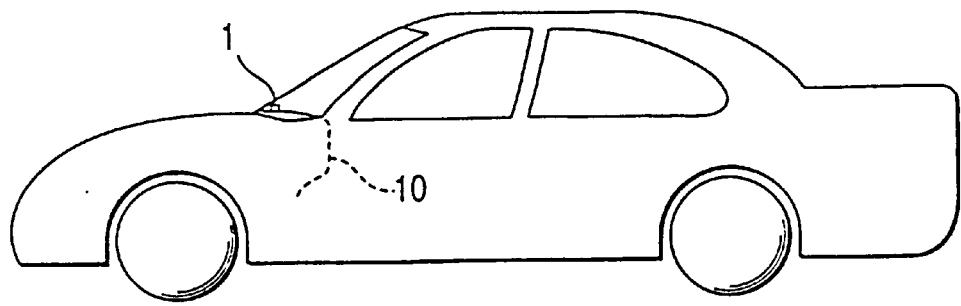
FIG. 27 is a side view of the first embodiment showing a sunlight sensor.

FIG. 27 is a side view of a first embodiment showing a sunlight sensor as an optical sensor. The sunlight sensor 1 is mounted on a dash panel 10.

Figure 1:
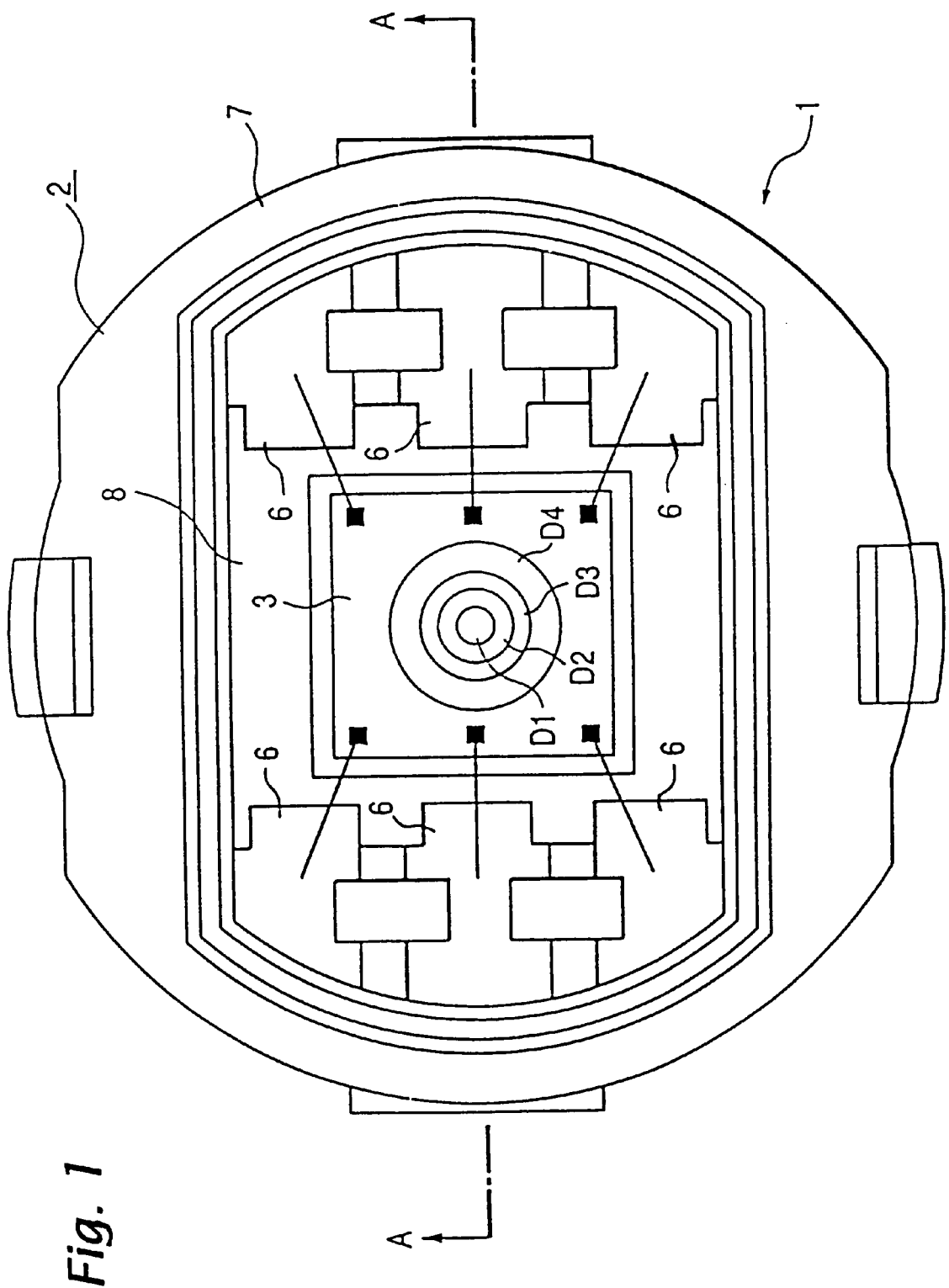
FIG. 1 is a plan view of a sunlight sensor of a first embodiment.
Figure 2:
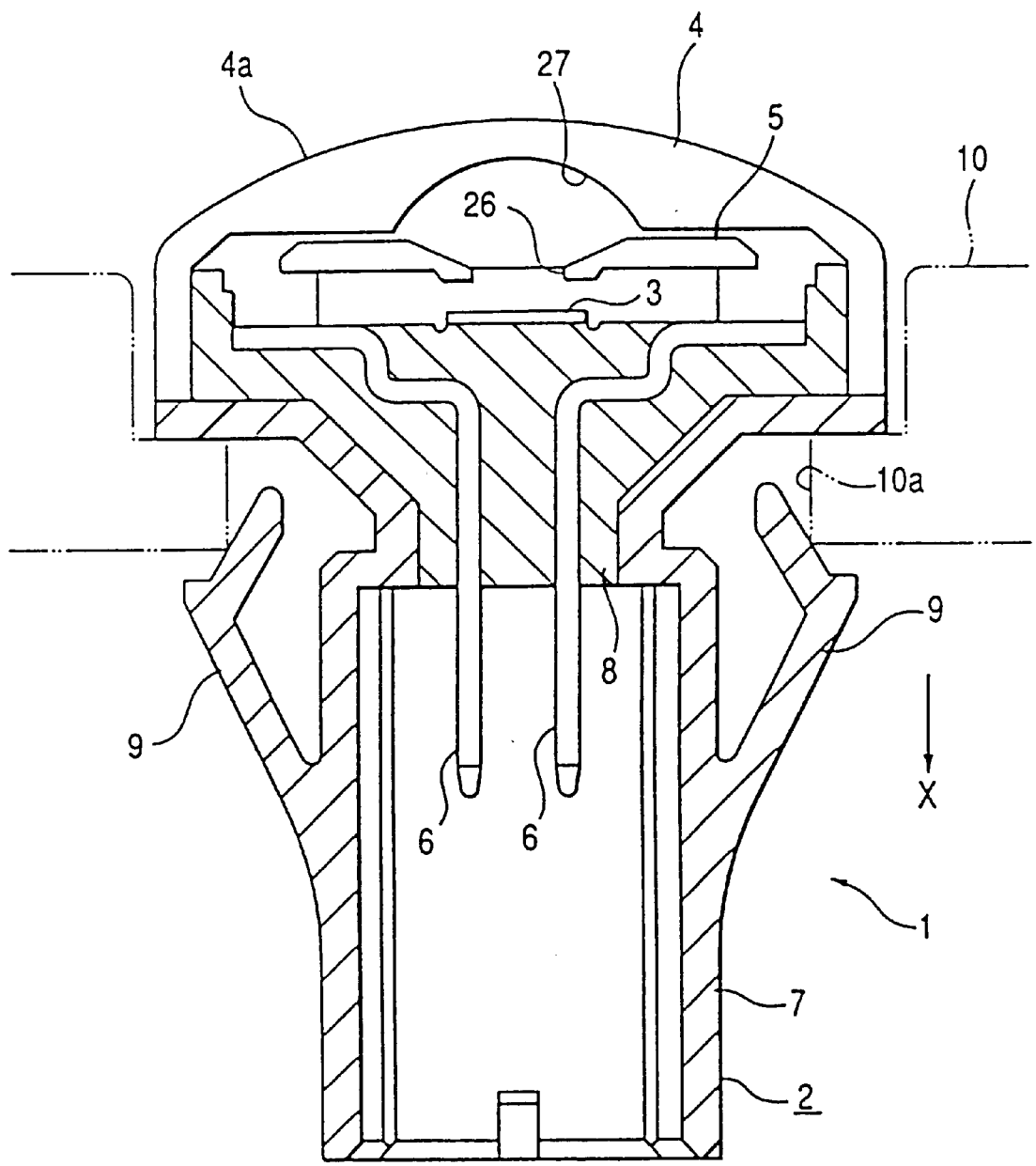
FIG. 2 is a cross-sectional side view of the sunlight sensor of the first embodiment taken on the line A—A in FIG. 1.

FIG. 1 is a plan view of the sunlight sensor 1 of the first embodiment. FIG. 2 is a cross-sectional side view of the sunlight sensor 1 of the first embodiment. FIG. 1 shows the sunlight sensor 1 with an(optical lens 4 and a slit plate (shield plate) 5 shown in FIG. 2 removed.

In FIG. 2, the sunlight sensor 1 includes a sensor housing 2 which also functions as a connector, a sensor chip 3, the optical lens 4, the slit plate 5, and terminals 6, wherein more than two terminals 6 may be provided which are partially hidden in FIG. 2. The sensor housing 2 includes a case 7 and a holder 8 which are made of a plastic material. The case 7 has a sleeve portion and is used in an upright condition. The holder 8 is fitted into an upper inside portion of the case 7. The case 7 is commonly used among various types of cars and the shape of the holder 8 is changed in accordance with the specifications of the cars.

As shown in FIG. 2, a ratchet 9 is provided on an outside peripheral surface of the case 7. The case 7 is inserted through a hole 10a in the dash panel 10 in the direction X, so that the sunlight sensor 1 is mounted on the dash panel 10 by forces generated by the ratchet 9 toward the edge of the hole 10a. At a middle of the upper surface of the holder 8, a sensor chip 3 is fixed. The holder 8 has terminals 6 as a ground terminal, a power supply terminal, and output terminals for outputting the sensor signal. The terminals 6 are fixed in the holder 8 by insert molding. Ends of the terminals 6 are exposed at the upper surface of the holder 8 and the other ends are exposed at the lower surface of the holder 8.

As shown in FIG. 1, four photodiodes (photodetectors) D1, D2, D3, and D4 are formed in the sensor chip 3 and generates detection signals in accordance with amounts of light entering them, respectively.

Figure 3:
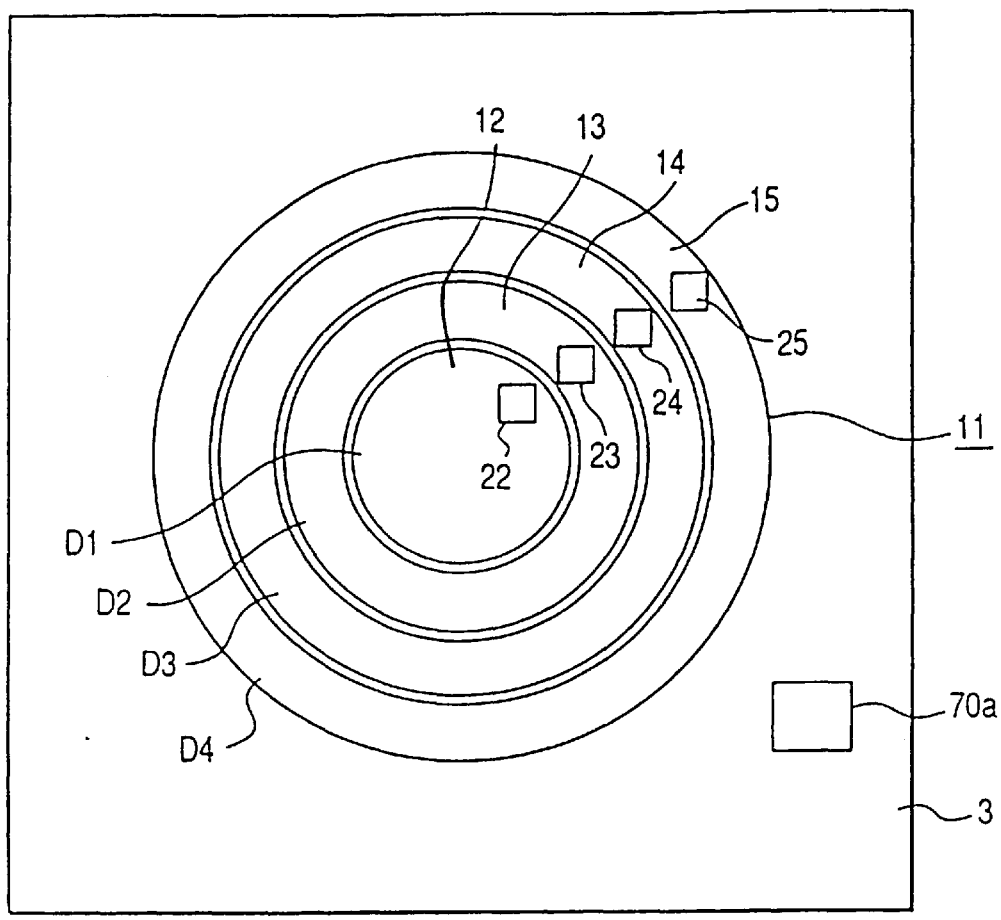
FIG. 3 is a partial plan view of the first embodiment showing a sensor chip in the sunlight sensor.

FIG. 3 is a partial plan view of the first embodiment showing the sensor chip 3. The sensor chip 3 includes the photodiodes D1 to D4 at a light receiving region 11 and a signal processing circuit 70a for processing the detection signals from the photodiodes D1 to D4. The light receiving region 11 is sectioned into a circle light receiving region 12 at the center of the light receiving region 11, a ring light receiving region 13 around the circle light receiving region 12, a ring light receiving region 14 around the circle light receiving region 13, and a ring light receiving region 15 around the ring light receiving region 14.

Figure 4:
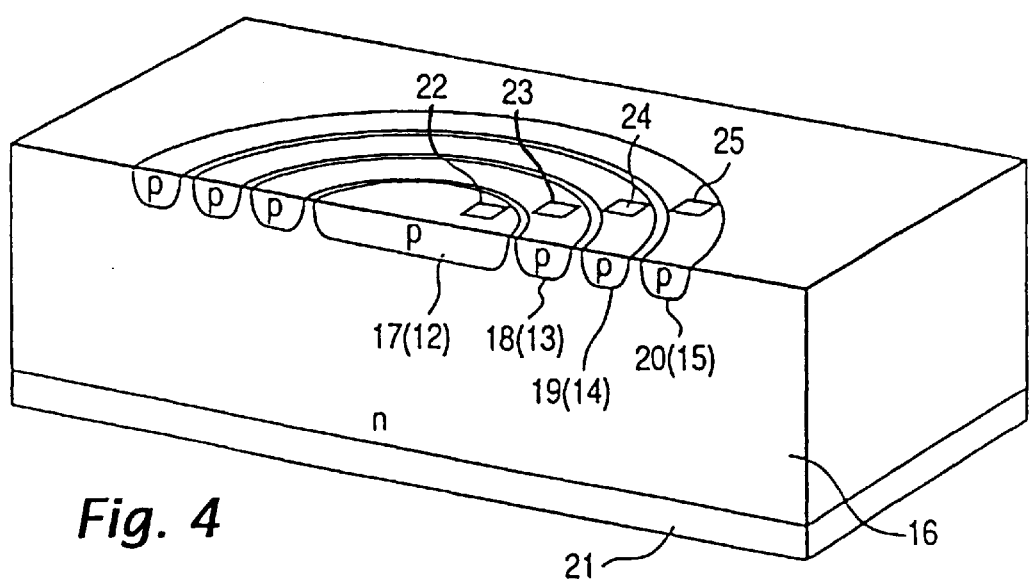
FIG. 4 is a perspective cross-sectional view of the first embodiment showing an internal structure of the sensor chip.

FIG. 4 is a perspective cross-sectional view of the first embodiment showing an internal structure of the sensor chip 3. In a top surface layer of n-silicon substrate 16, a circular p-region 17 is formed and therearound, ring p-regions 18, 19, and 20 are formed. On the bottom surface of the n-silicon substrate 16, a cathode electrode 21 is formed and anode electrodes 22, 23, 24, and 25 are provided on the p-regions 17, 18, 19, and 20. Therefore, the photodiode D1 is formed at the p-region 17, the photodiodes D2 is formed at the p-region 18, the photodiode D3 is formed at the p-region 19, and the photodiodes D4 is formed at the p-region 20, so that when light hits the respective regions 12 to 15, the detection signals (photocurrents) are generated in accordance with the amounts of light. In FIG. 3, outside the light receiving region 11, the signal processing circuit 70a is formed on the sensor chip 3.

In FIG. 2, above the sensor chip 3, the slit plate 5 is supported by an top surface of the holder 8 such that it partially shades the sensor chip 3 from the incident light.

Figure 5:
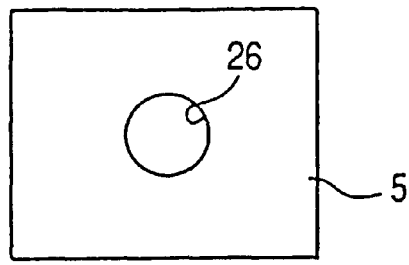
FIG. 5 is a plan view of the first embodiment showing the slit plate shown in FIG. 2.

FIG. 5 is a plan view of the first embodiment showing the slit plate. The slit plate 5 is made of an opaque material and has a slit (through hole) 26 at the middle thereof. The slit 26 having a circle shape allows to pass incident light therethrough and positioned just above the sensor chip 3.

In FIG. 2, the optical lens 4 is made of colored glass or a plastic (translucent material) and has a bowl shape. The top surface 4a of the optical lens 4 is processed to have a ground glass surface. The optical lens 4 is fitted around the outer surface of the holder 8 and supported by the housing 2 above the sensor chip 3. Moreover, an inner surface (bottom surface) of the optical lens 4, a hollow portion 27 is formed at the inner surface to provide a meniscus lens function. Moreover, to provide the meniscus lens function, other lens such as a Fresnel lens can be used.

The optical lens 4 and the slit plate 5 provides a light amount controlling function (first sensitivity control function) which controls the light mount to the sensor chip 3 in accordance with an incident angle (elevation angle) of light.

Figure 6:
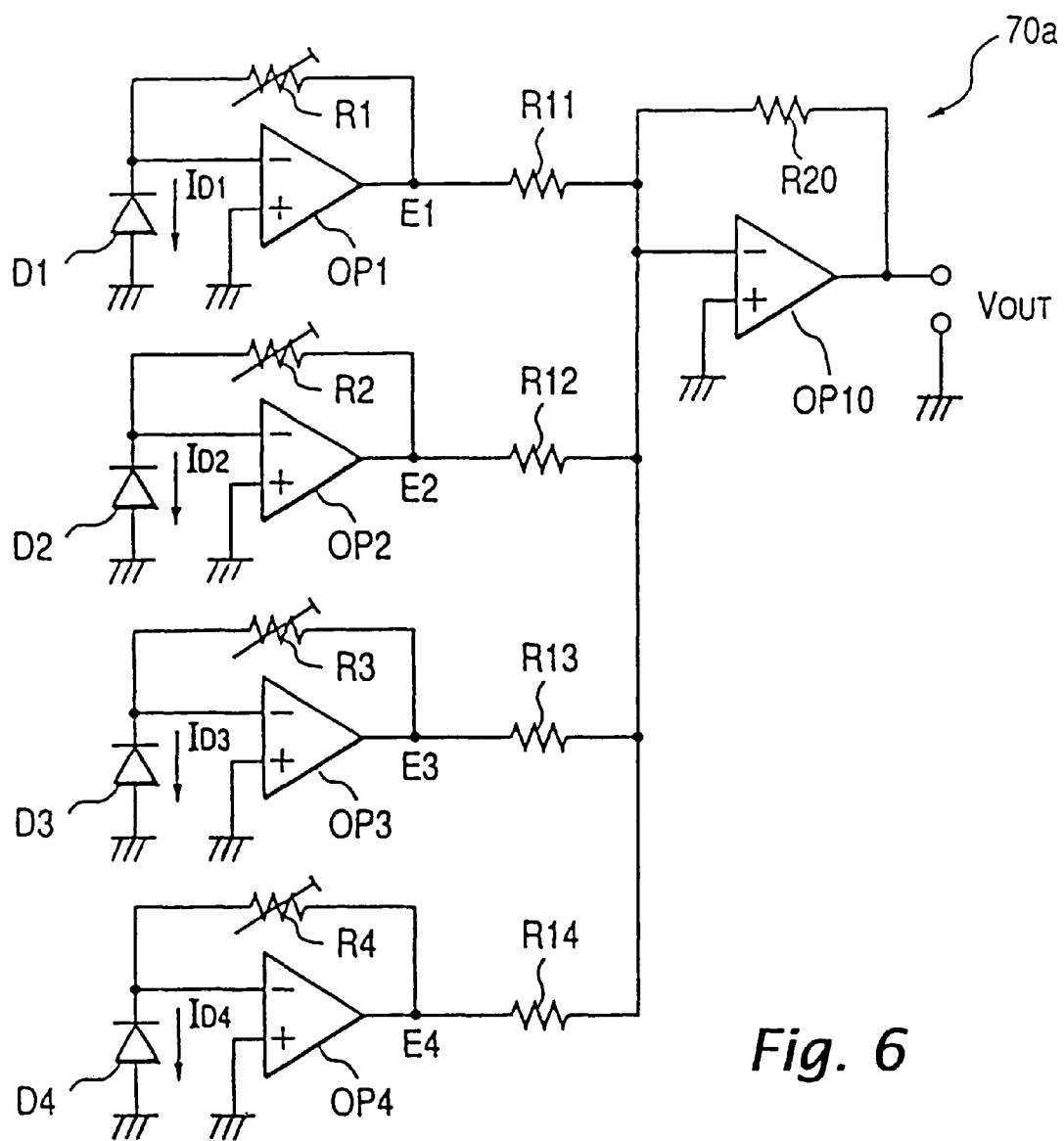
FIG. 6 is a schematic circuit diagram of the first embodiment showing the processing circuit shown in FIG. 3.

FIG. 6 is a schematic circuit diagram of the first embodiment showing the processing circuit 70a for processing the detection signals.

A cathode of the photodiode D1 is connected to a non-inverting input terminal of an operational amplifier OP1. The photodiode D1 generates a photocurrent $I_{D1}$ in accordance with an amount of light thereto. The operational amplifier OP1 has a laser trimming resistor R1 for feeding the output thereof back to the non-inverting input terminal. Therefore, an output voltage E1 of the operational amplifier OP1 varies with the photocurrent $I_{D1}$ (detection signal) flowing through the photodiode and thus, the operational amplifier OP1 and the laser trimming resistor R1 forms a current-voltage conversion circuit (I-V conversion circuit). In this I-V convention circuit, adjusting the resistance of the laser trimming resistor R1 controls the gain of the detection signal from the photodiode D1.

Similarly, a cathode of the photodiode D2 is connected to a non-inverting input terminal of an operational amplifier OP2. The photodiode D2 generates a photocurrent ID2 in accordance with an amount of light thereto. The operational amplifier OP2 has a laser trimming resistor R2 for feeding the output thereof back to the non-inverting input terminal. Therefore, an output voltage E2 of the operational amplifier OP2 varies with the photocurrent $I_{D2}$ (detection signal) flowing through the photodiode and thus, the operational amplifier OP2 and the laser trimming resistor R2 forms a current-voltage conversion circuit (I-V conversion circuit). In this I-V convention circuit, adjusting the resistance of the laser trimming resistor R2 controls the gain of the detection signal from the photodiode D2.

Moreover, a cathode of the photodiode D3 is connected to a non-inverting input terminal of an operational amplifier OP3. The photodiode D3 generates a photocurrent $I_{D3}$ in accordance with an amount of light thereto. The operational amplifier OP3 has a laser trimming resistor R3 for feeding the output thereof back to the non-inverting input terminal. Therefore, an output voltage E3 of the operational amplifier OP3 varies with the photocurrent $I_{D3}$ (detection signal) flowing through the photodiode and thus, the operational amplifier OP3 and the laser trimming resistor R3 forms a current-voltage conversion circuit (I-V conversion circuit). In this I-V convention circuit, adjusting the resistance of the laser trimming resistor R3 controls the gain of the detection signal from the photodiode D3.

Further, a cathode of the photodiode D4 is connected to a non-inverting input terminal of an operational amplifier OP4. The photodiode D4 generates a photocurrent $I_{D4}$ in accordance with an amount of light thereto. The operational amplifier OP4 has a laser trimming resistor R4 for feeding the output thereof back to the non-inverting input terminal. Therefore, an output voltage E4 of the operational amplifier OP4 varies with the photocurrent $I_{D4}$ (detection signal) flowing through the photodiode and thus, the operational amplifier OP4 and the laser trimming resistor R4 forms a current-voltage conversion circuit (I-V conversion circuit). In this I-V convention circuit, adjusting the resistance of the laser trimming resistor R4 controls the gain of the detection signal from the photodiode D4.

The resistances of the resistors R1 to R4 are trimmed by the laser processing to adjust gains of the detection signals to weight sensitivities of the photodiodes D1 to D4.

The output terminals of the operational amplifiers OP1 to OP4 are connected to a non-inverting input of the operational amplifier through resistors R11 to R14 respectively. The operational amplifier OP10 sums the output signals (voltages) E1 TO E4 of the respective operational amplifiers OP1 to OP4. The operational amplifier OP10 has a feed back resistor R20. Therefore, the sum value (E1+E2+E3+E4) is amplified with predetermined gain and outputted as a sensor signal (output voltage $V_{OUT}$) at the output terminal of the operational amplifier OP10.

The gains of the amplifiers OP1 to OP4, that is, weighting coefficients, are k1=1, k2=0, k3=3, k4=5. Moreover, the gain of the operational amplifier OP10 can be adjusted by changing the resistance of the resistor R20 by the laser trimming.

Then, an operation of the sunlight sensor 1 will be described.

In. FIG. 2, light incident to the top surface 4a of the optical lens 4 transmits through the optical lens 4. A portion of a light beam from the lens 4 is stopped by the slit 5 and the other portion of the beam transmits through the slit 26 and hits the photodiodes D1 to D4 of the sensor chip 3. In response to the other portion of the light beam the photodiodes D1 to D4 outputs the detection signals E1 to E4. That is, the light enters the optical lens 4 and transmits therethrough with the light pass changed by the shape and the refraction index of the lens 4 and the light is emitted as the light beam toward the sensor chip 3. The light beam passes through the slit 26 of the slit plate 5 and reaches the sensor chip 3. In this structure, providing a hollow portion 27 in the bottom surface of the lens 4 makes it possible to introduce light in the horizontal direction (elevation angle =0°) into the sensor chip 3.

Figure 7:
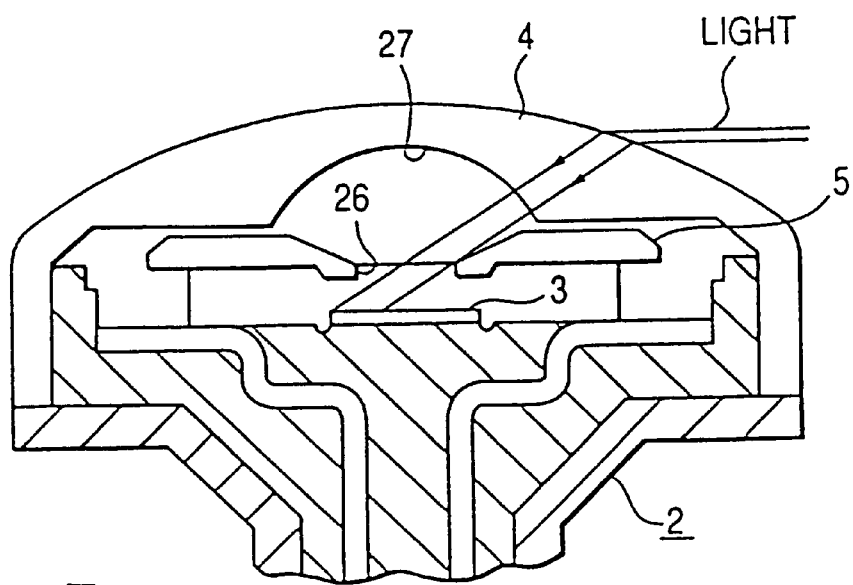
FIG. 7 is a partial cross-sectional view of the first embodiment for illustrating the operation of the optical lens shown in FIG. 2.

FIG. 7 is a partial cross-sectional view of the first embodiment for illustrating the operation of the optical lens 4.

The light incident at an elevation angle=0° enters the lens 4 and the lens 4 bends the light path and the emitted light beam hits sensor chip 3 through the slit 26.

Figure 8:
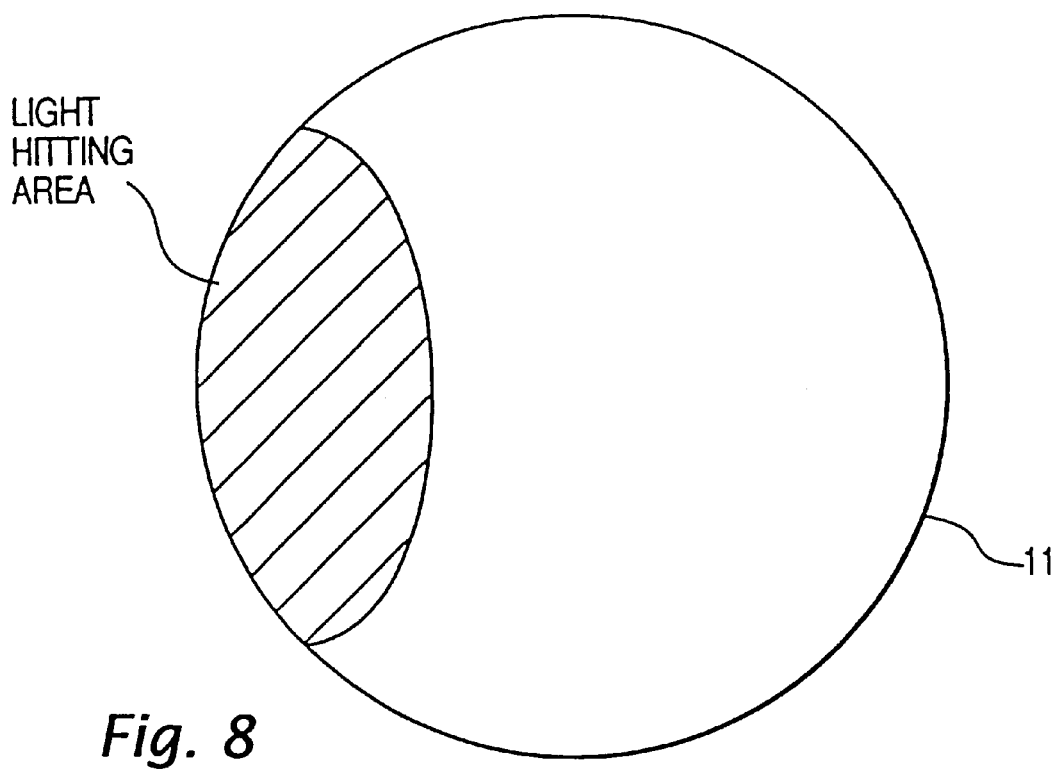
FIG. 8 is an illustration of the first embodiment showing a light hitting area on the light receiving region of the sensor chip when the elevation angle is 0°.

FIG. 8 is a illustration of the first embodiment showing a light hitting area on the light receiving region 11 of the sensor chip 3 when the elevation angle is 0°. As shown in FIG. 8, the light hits an peripheral portion of the light receiving region 11 of the sensor chip 3.

Figure 9:
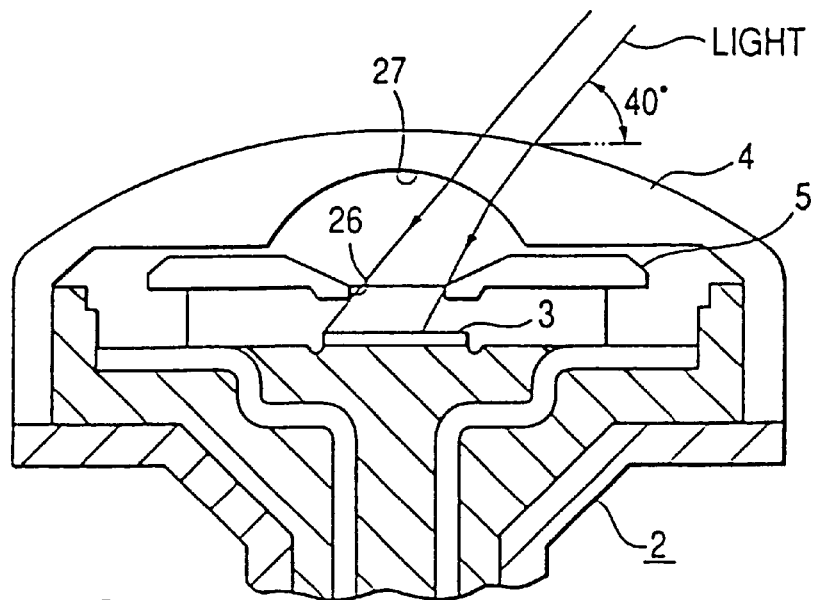
FIG. 9 is a partial cross-sectional view of the first embodiment for illustrating the operation of the optical lens shown in FIG. 2.

FIG. 9 is a partial cross-sectional view of the first embodiment for illustrating the operation of the optical lens 4.

The light incident at an elevation angle =40° enters the lens 4 and the lens 4 diverges the light and the emitted light beam hits sensor chip 3 through the slit 26.

Figure 10:
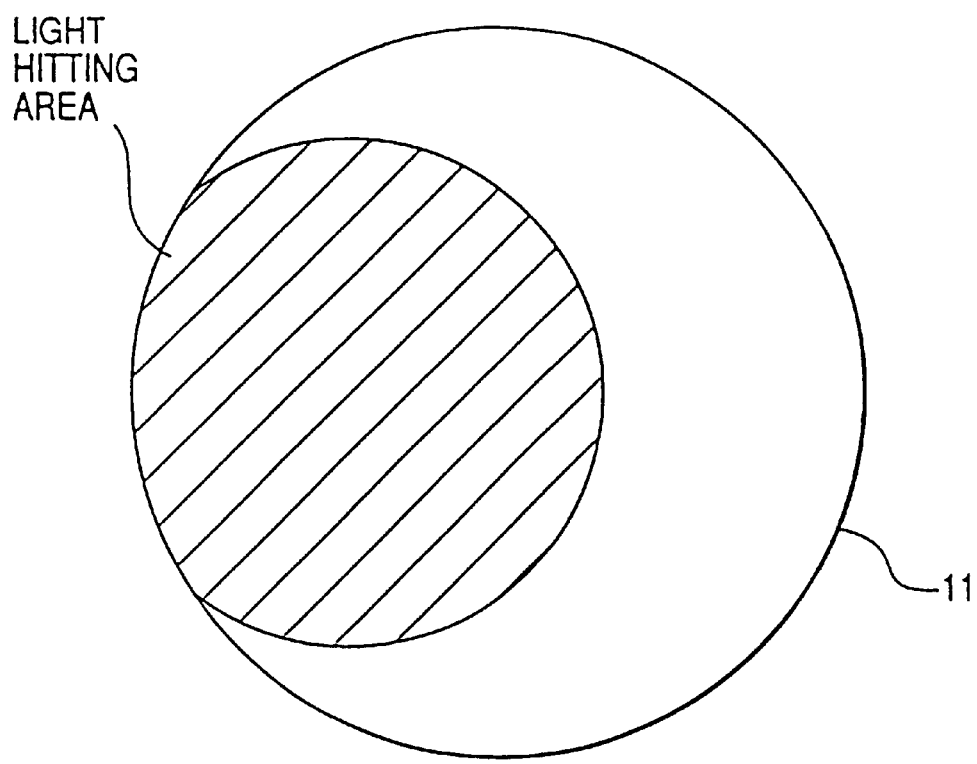
FIG. 10 is an illustration of the first embodiment showing a light hitting area on the light receiving region of the sensor chip when the elevation angle is 40°.

FIG. 10 is an illustration of the first embodiment showing a light hitting area on the light receiving region 11 of the sensor chip 3 when the elevation angle is 40°. As shown in FIG. 10, the light beam hits about a half area of the light receiving region 11 of the sensor chip 3 (the left half in FIG. 10).

Figure 11:
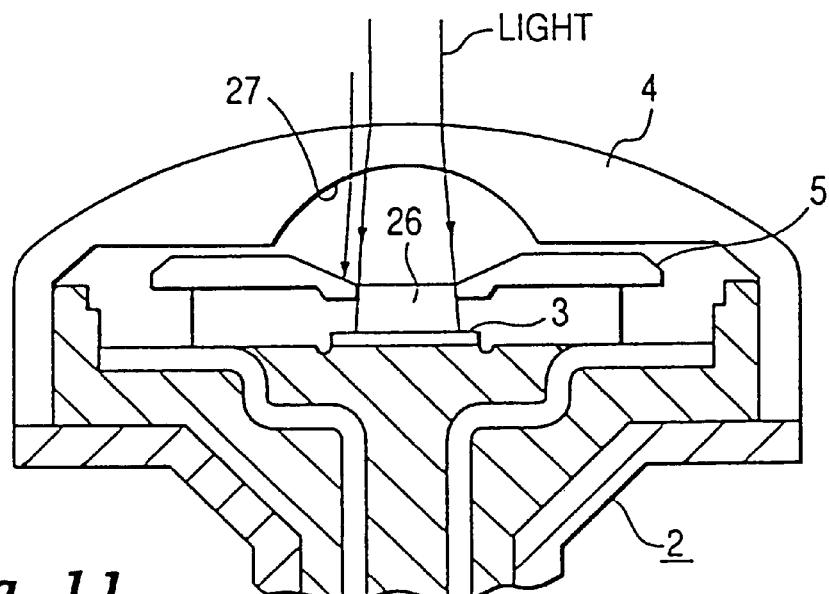
FIG. 11 is a partial cross-sectional view of the first embodiment for illustrating the operation of the optical lens shown in FIG. 2.

FIG. 11 is a partial cross-sectional view of the first embodiment for illustrating the operation of the optical lens 4.

The light incident at an elevation angle=90° (incident angle=0°) enters the lens 4 and the lens 4 diverges the light and the emitted light beam hits sensor chip 3 through the slit 26, wherein a portion of light is stopped by the slit plate 5 which reached the photodiode 4 if the slit plate 5 is inexistent.

Figure 12:
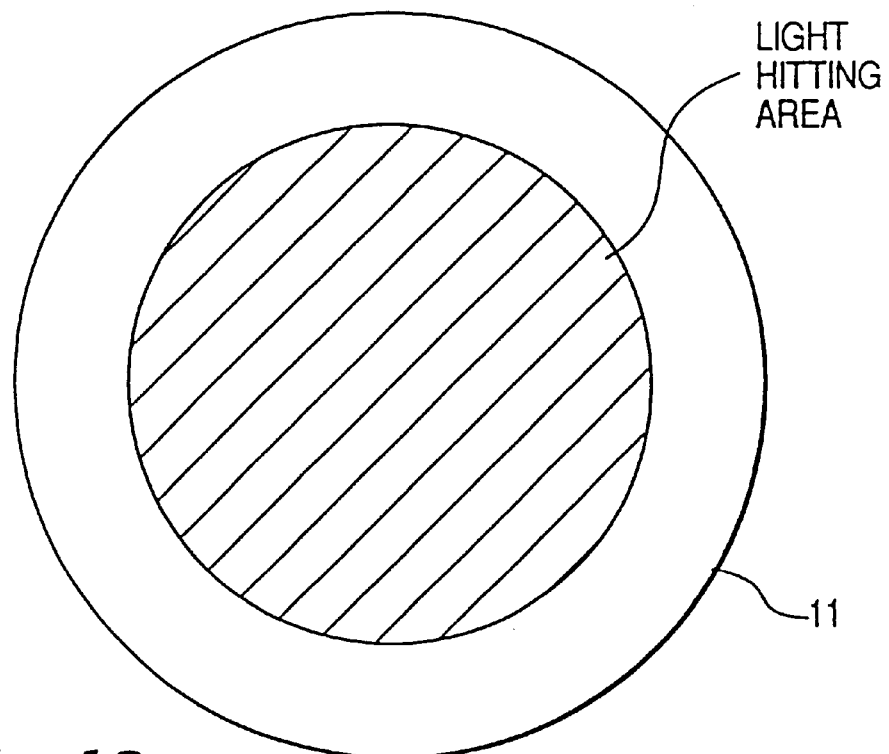
FIG. 12 is an illustration of the first embodiment showing a light hitting area on the light receiving region of the sensor chip when the elevation angle is 90°.

FIG. 12 is an illustration of the first embodiment showing a light hitting area on the light receiving region 11 of the sensor chip 3 when the elevation angle is 90°. As shown in FIG. 12, the light beam hits a middle portion of the light receiving region 11 of the sensor chip 3. As clearly understood from FIGS. 7, 9, and 11, when the elevation angle is low, the light hitting area appears on the opposite side to the incident side on the light receiving region 11.

As mentioned, the amount of the light beam which hits the light receiving region 11 is controlled by the light amount control function of optical lens 4 and the split plate 5, wherein the light hitting area varies in accordance with the elevation angle of the incident light.

Figure 13:
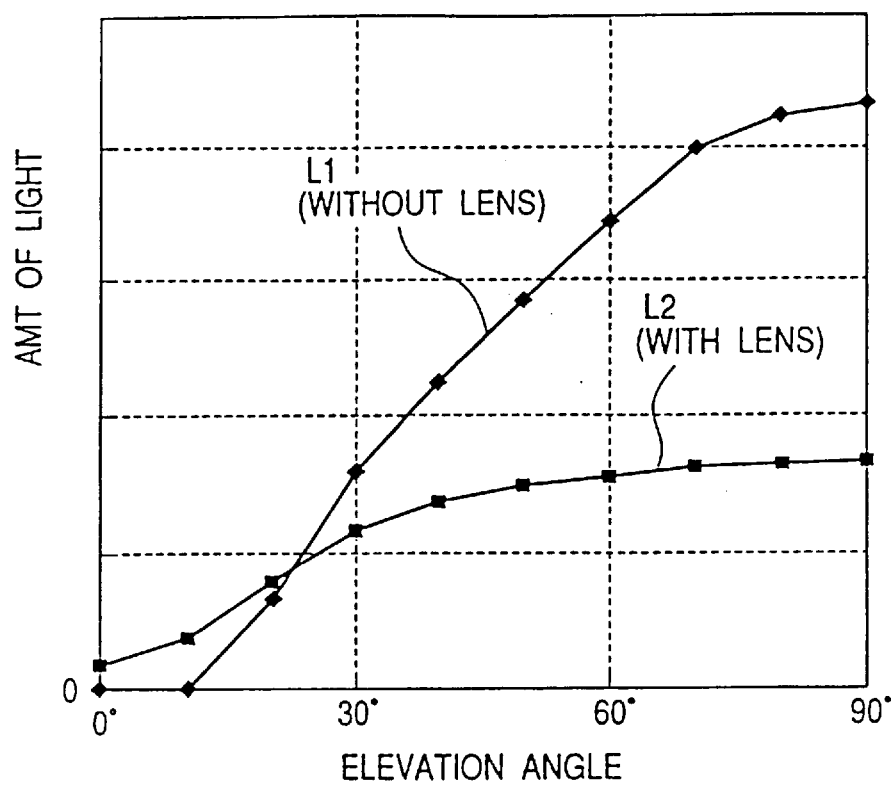
FIG. 13 is a graphical drawing of the first embodiment showing characteristics of amounts of light received by the sensor chip regarding the elevation angle of the incident light.

FIG. 13 is a graphical drawing of the first embodiment showing characteristics of amounts of light received by the sensor chip 3 regarding the elevation angle of the incident light (directivity) between the cases that the optical lens 4 is existent and inexistent.

In FIG. 13, a curve L1 represents the characteristic of amount of the received light when the optical lens 4 is inexistent and a curve L2 represents the characteristic of amount of the received light when the optical lens 4 is existent. The curve L1 shows that the amount of the received light is high when the elevation angle is high and is almost zero when the elevation angle is low. On the other hand, the curve L2 shows that the amount of the received light is suppressed when the elevation angle is high and is increased to some extent when the elevation angle is low. Therefore, the first light amount control function is provided with the optical lens 4 and the slit plate 5. The optical lens 4 increases the amount of the received light when the elevation angle is low as shown in FIG. 7, wherein the slit plate 5 does not shield the light beam emitted by the optical lens 4. On the other hand, the slit plate 5 suppresses the amount of the received light when the elevation angle is high as shown in FIG. 11, wherein the slit plate 5 shields a peripheral portion the light beam emitted by the optical lens 4.

This light amount (directivity) control function can be controlled by adjusting the shape of the hollow portion of the 27 and the shape or a potion of the slit plate 5 to provide a desired directivity. However, in this embodiment, the directivity is controlled by adjusting the resistance of the laser trimming resistors R1 to R4 to provide the desired directivity.

Then, the procedure for obtaining a desired directivity will be described.

Figure 14:
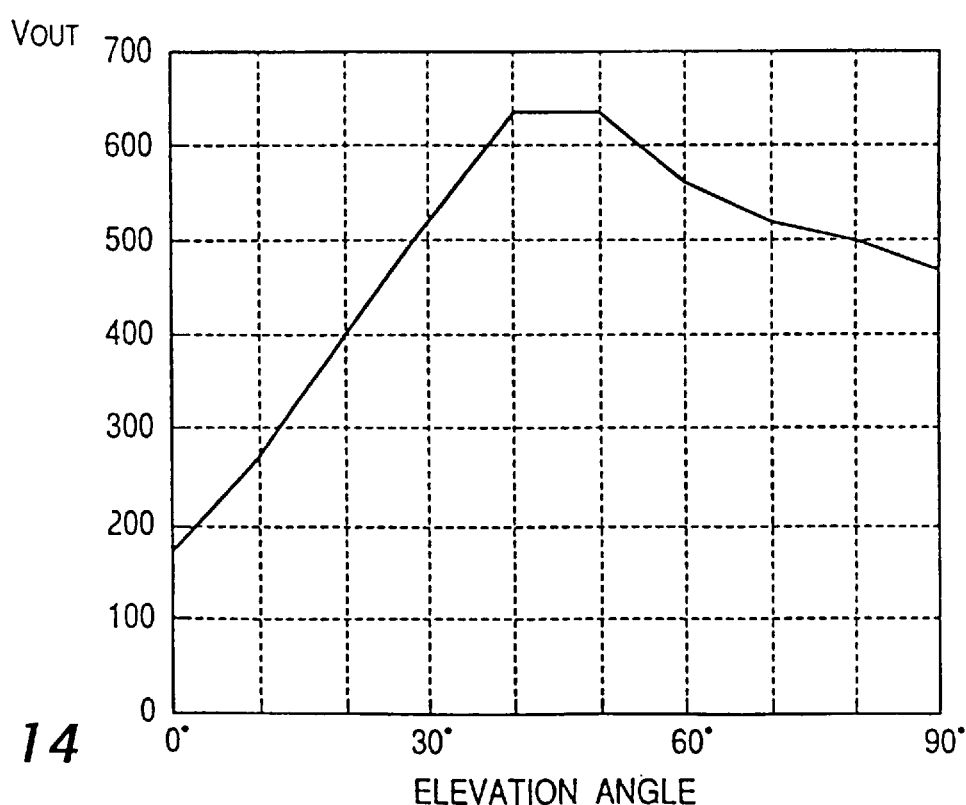
FIG. 14 is a graphical drawing of the first embodiment showing a desired directivity.

FIG. 14 is a graphical drawing of the first embodiment showing a desired directivity (result directivity).

At first, the optical lens 4 having a predetermined lens characteristic, the slit plate 5, and the sensor chip 3 before trimming are assembled. Then, the photocurrents of the photodiodes D1 to D4 are measured with the elevation angle of the incident light varied. Then, the laser trimming resistors R1 to R4 are trimmed to provide the sensor output $V_{OUT}$ having the desired directivity as shown in FIG. 14.

Figure 15:
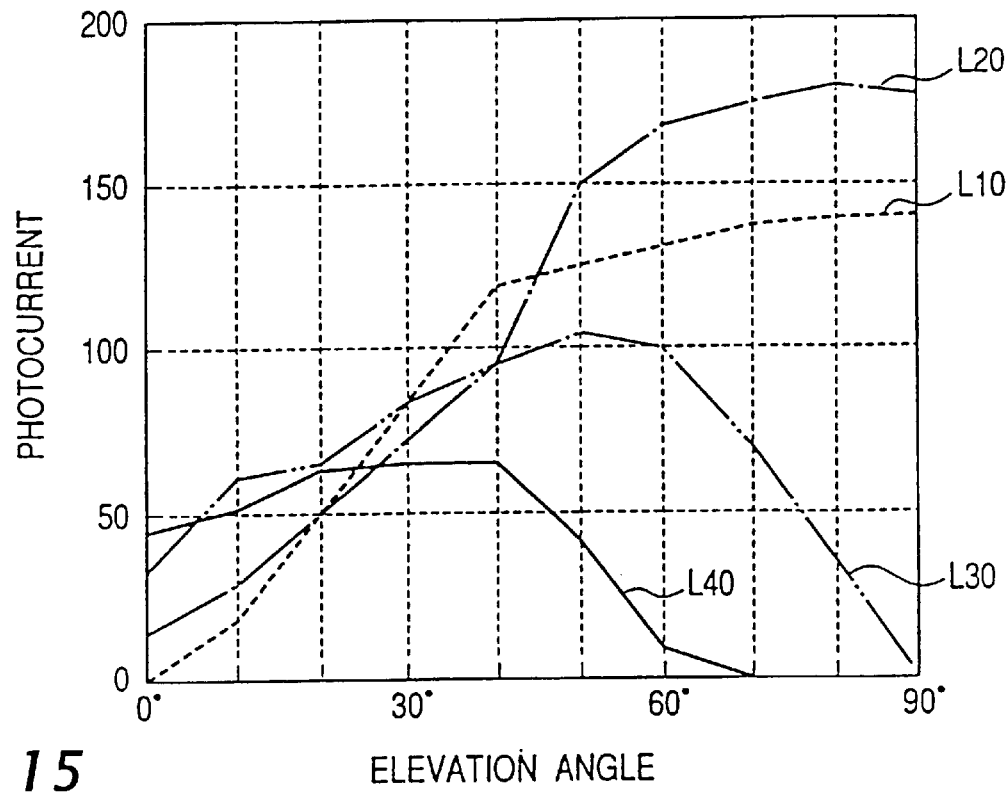
FIG. 15 is a graphical drawing of the first embodiment showing measurement result of the output voltages.

FIG. 15 is a graphical drawing of the first embodiment showing measurement result of the output voltages E1 to E4. L10 represents the variation of the photocurrent of the photodiode D1 having the circle light receiving region 12, L20 represents the variation of the photocurrent of the photodiode D2 having the ring light receiving region 13, L30 represents the variation of the photocurrent of the photodiode D3 having the ring light receiving region 14, and L30 represents the variation of the photocurrent of the photodiode D4 having the ring light receiving region 15. In FIG. 15, the photocurrents of the photodiodes D1 and D2 are relatively high at high elevation angle and low at low elevation angle as shown in L10 and L20. On the other hand, the photocurrents of the photodiodes D3 and D4 are relatively high at low elevation angles and low at middle and high elevation angles compared with the photodiodes D1 and D2 as shown in L30 and L40.

These characteristics are provided by the shape and the refractive index of the optical lens 4 and the slit 26 of the slit plate 5 as mentioned above. That is, at a high elevation angle, the photodiodes D3 and D4 are shielded from the emitted light beam by the slit 26 and at a low elevation angle, amounts of light to the photodiodes D1, and D2 are suppressed.

The desired directivity in the output Vout shown in FIG. 14 is obtained by amplifying the photocurrents shown in FIG. 15 with gains trimmed by the processing circuit 70a. From the characteristics of the photocurrents of the photodiodes D1 to D4, the gains are determined as K1=1, k2=0, k3=3, and k4=5. Then, the laser timing resistors R1 to R4 are subjected to the laser trimming processing.

Then, the operational amplifier OP10 sums the output voltages E1 to E4 to provide the sensor output Vout as shown in FIG. 14. In FIG. 14, the sensor output voltage Vout shows a peak when the elevation angles are between 40° to 50° and shows a low voltage when the elevation angle is low. This characteristic equivalently provides another light amount (directivity) control function and corresponds to a heat load characteristic for controlling an air conditioner (vehicle air conditioner) and are determined in accordance with the shape of the vehicle (particularly, the shape of the front windshield glass).

As mentioned above, in this embodiment, the light amount control function is provided by the shape of the optical lens 4 and the slit 26 and the another light amount control function is provided by a plurality of photodiodes D1 to D4 and the processing circuit 70a which controls the gains of the detection signals from the photodiodes D1 to D4 to provides the sensor output voltage Vout which is a sum of the amplified detection signals of which gains are trimmed.

As mentioned, in the first embodiment, four photodiodes D1 to D4 are arranged at the light receiving region 11 and the sensitivities of the photodiodes D1 to D4 are differently weighted. Therefore, after the optical lens 4, the slit plate 5, and the sensor chip 3 have been prepared, the desired directivity in the sensor output Vout can be provided by weighting the detection signals from the photodiodes D1 to D4 by trimming the laser trimming resistors R1 to R4. This processing is easier than preparing the optical lens 4 again. Moreover, the directivity is controlled in accordance with the desired directivity which is determined in accordance with the shape of the different type of vehicles. Then, this optical sensor is compatible among all vehicles by determining the trimming amounts of the laser trimming resistors R1 to R4 every vehicle type.

Moreover, respective photodiodes are formed coaxially, so that there is a tendency that the directivities of respective photodiodes D1 to D4 regarding the elevation angle are not subject to orientation of the incident light. That is, the optical sensor mounted in the vehicle detects the sunlight of which orientation angle varies. The coaxially arranged photodiodes D1 to D4 satisfy the constant orientation angle characteristic. Therefore, the constant directivity regarding the elevation angle can be obtained irrespective of the orientation of the sun.

This embodiment is described to obtain the desired directivity corresponding to the heat load characteristic of the air conditioner. However, this invention is applicable to other optical sensor for measuring an amount of light of which directivity is controlled.

Modification will be described.

Figure 16:
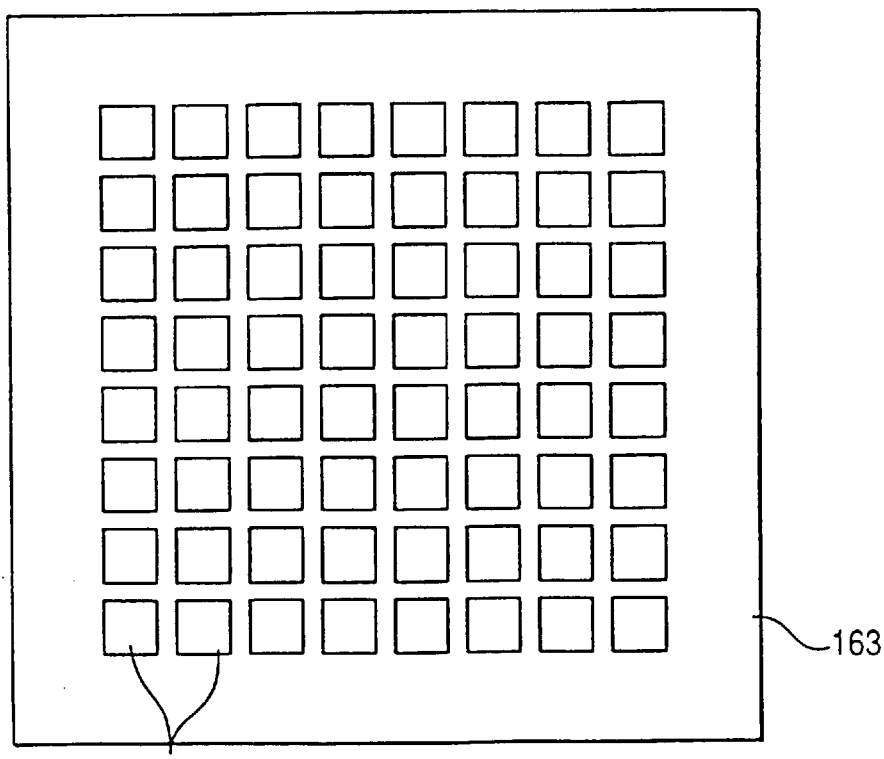
FIGS. 16 to 18 are plan views of sensor chips of modifications.
Figure 17:
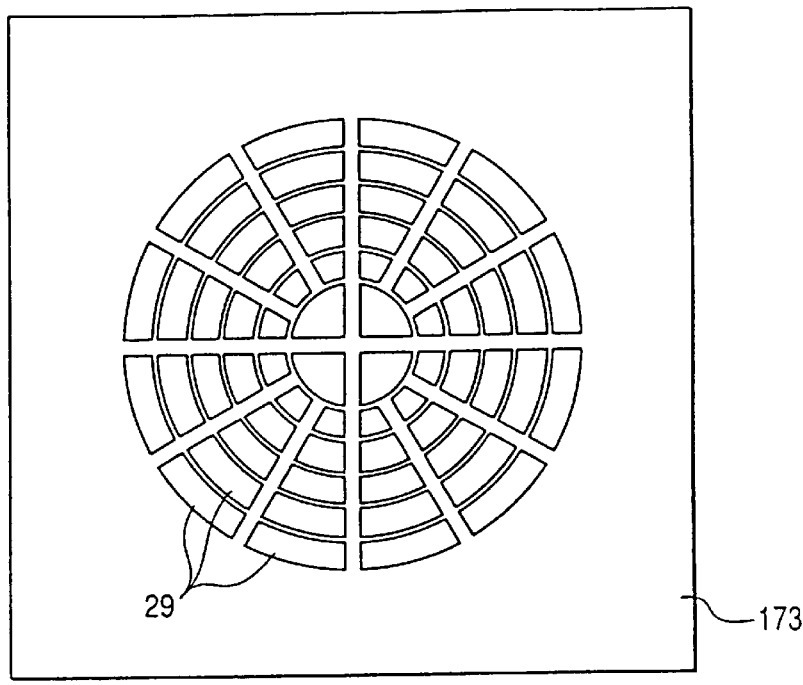
Figure 18:
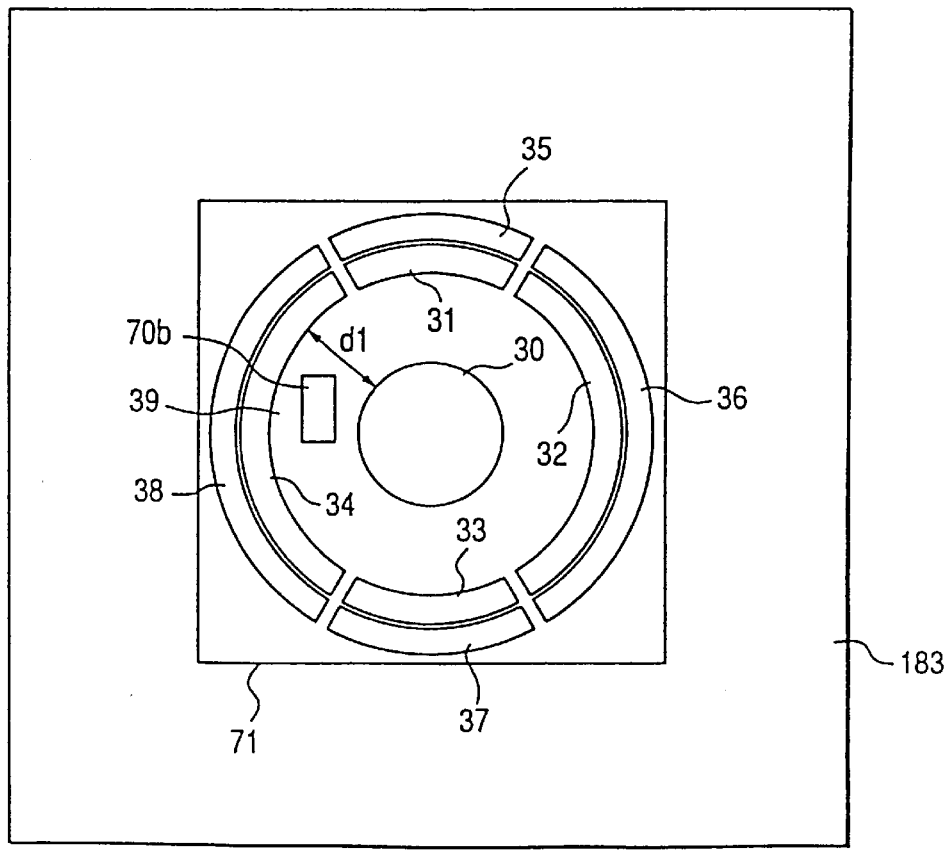

FIGS. 16 to 18 are plan views of sensor chips of modifications.

In the structure of the sensor chip 3, the light receiving region 11 is divided into four sections. However, a larger number of sections makes a degree of freedom in designing the sensor chip. For example, as shown in FIG. 16, photodiodes 28 arranged in a matrix provides such a sensor chip 163. Moreover, as shown in FIG. 17, the sensor chip 173 includes photodiodes 29 arranged such that a center circle pattern is equiangularly divided and ring patterns are equiangularly divided.

Moreover, as shown in FIG. 18, the sensor chip 183 provides a plurality of directivities. The sensor chip 183 includes a circle light receiving region 30 at middle of the top surface of the sensor chip 183, arc light receiving regions 31 to 34, and outer arc light receiving regions 35 to 38, wherein the arc light receiving regions 31 to 34 are apart from the circle light receiving regions 30 by a distance d1.

The detection signal from the circle light receiving region 30 is used to provide a directivity (I) and detection signals from the circle light receiving region 30 and arc light receiving regions 31 to 38 are used to provide a directivity (II).

Figure 19:
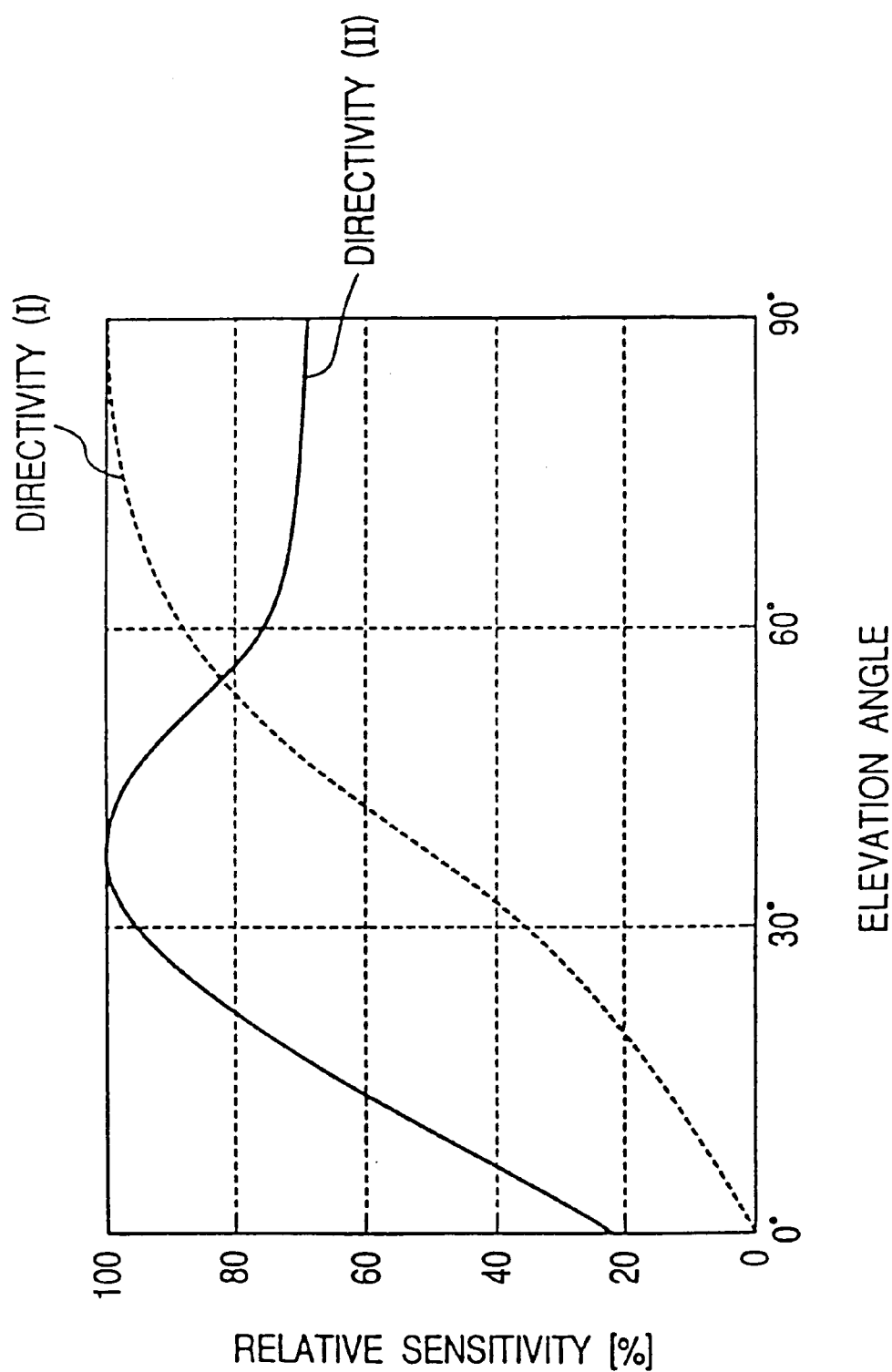
FIG. 19 is a graphical drawing of the modification showing the directivities (I) and (II)

FIG. 19 is a graphical drawing of the modification showing the directivities (I) and (II).

In the directivity (I), the sensitivity at a low elevation angle is low and the sensitivity at a high elevation angle is high. On the other hand, the directivity (II) shows a peak sensitivity around the elevation angle of 35° and low sensitivities at low angles.

A plurality of the directivities provides different controls. For example, the directivity (I) is used for controlling turning on and off head lights (not shown) and the directivity (II) is used for controlling the air conditioner (not shown) as mentioned earlier. That is, one sensor chip 183 outputs two different sensor signals having different directivities, so that a space efficiency in providing the optical sensor on a dash panel 10 is high.

To provide the sensor signal showing the directivity (I), a transistor which is different from the transistor Q2 is provided with respect to the transistor Q1 in a current Miller circuit including D1 shown in FIG. 23 mentioned later, wherein the current Miller ratio is adjusted in the provided transistor.

Figure 28:
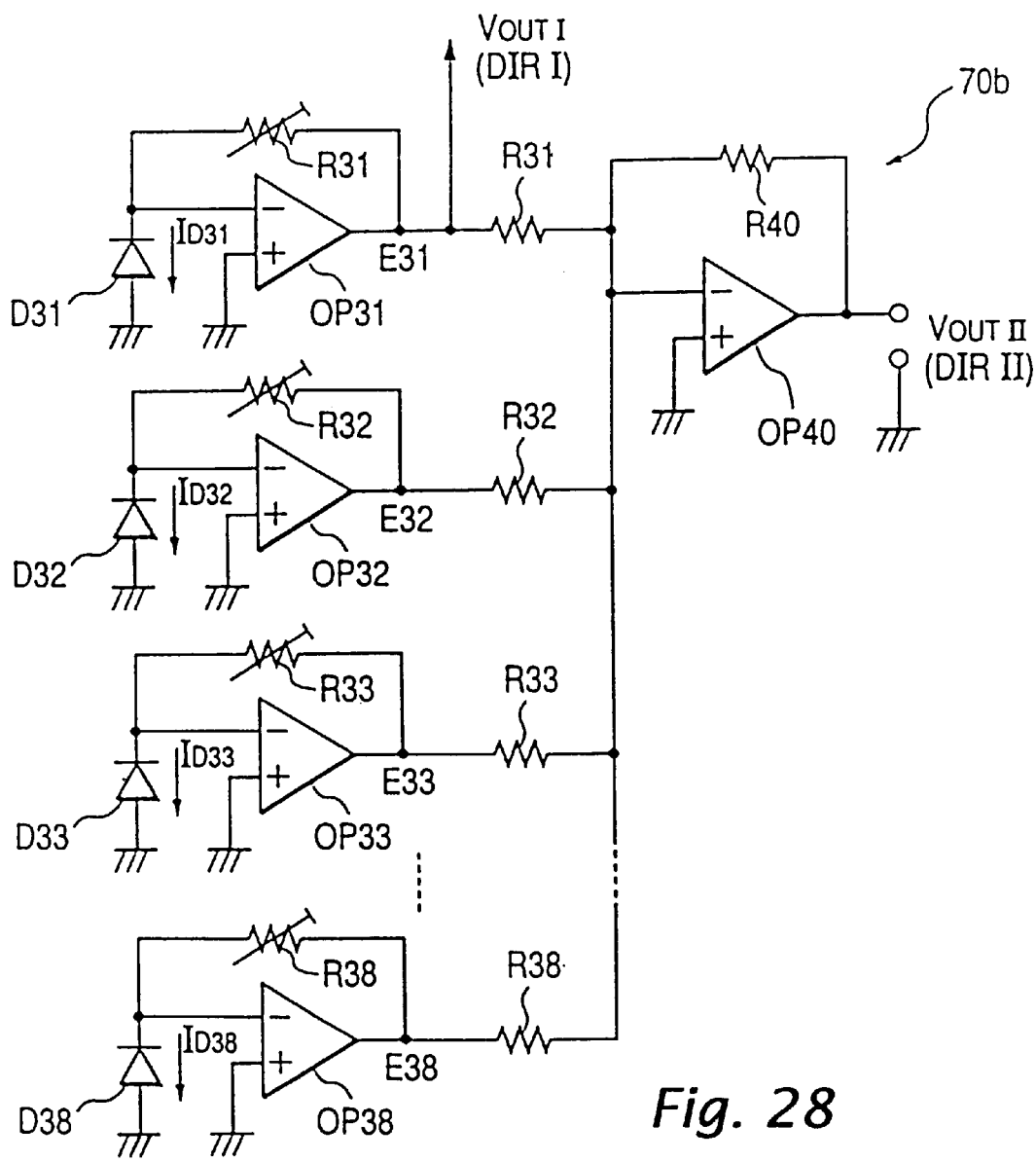
FIG. 28 is a schematic circuit diagram of a modification.

FIG. 28 is a schematic circuit diagram of a modification. A processing circuit 70b is similar to the processing circuit 70a shown in FIG. 6. The difference is that eight I-V conversion circuits, each including a photodiode and an operational amplifier having a feedback resistor are provided and an output E31 of the operational amplifier OP31 is independently outputted as the sensor signal $V_{OUT1}$ showing the directivity (I). On the other hand, the operational amplifier OP40 sums the outputs E31 to E38 of the operational amplifiers OP 31 to OP38 and outputs the sensor signal $V_{OUT11}$ showing the directivity (II).

In FIG. 18, the processing circuit 70b is provided between the circle light receiving region 30 and the arc light receiving region 34 because there is a space 39 between the circle light receiving region 30 and the arc light receiving regions 31 to 34 by the distance d1. The space 39 does not contribute providing the directivity II, which was indirectly mentioned in the first embodiment. That is, in the first embodiment, the gain k2 of the operational amplifier OP2 is 0. Then, this dead space is used for arranging the processing circuit 70b to increase a space efficiency in the circuit forming region 71 on the sensor chip 183, which contributes miniaturization of the optical sensor.

Figure 20:
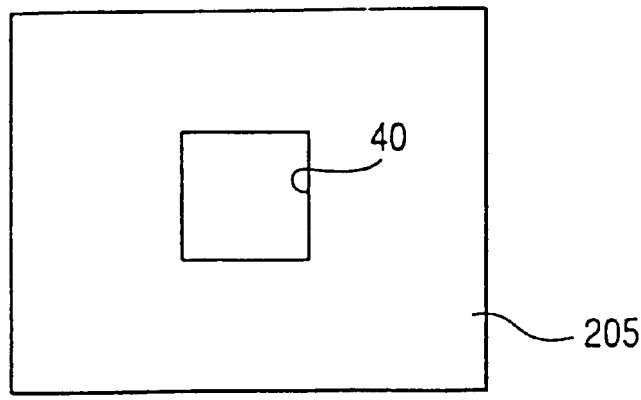
FIGS. 20 to 22 are plan views of modifications.
Figure 21:
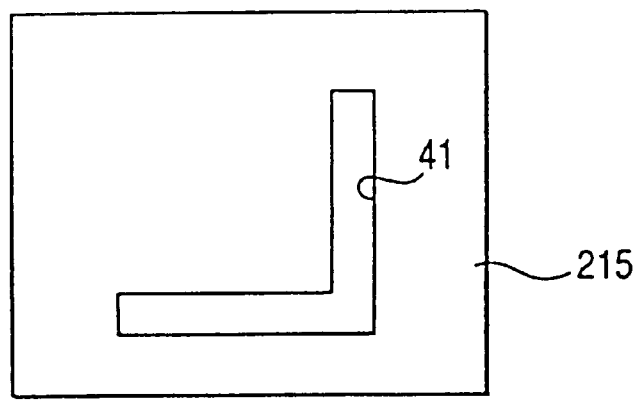
Figure 22:
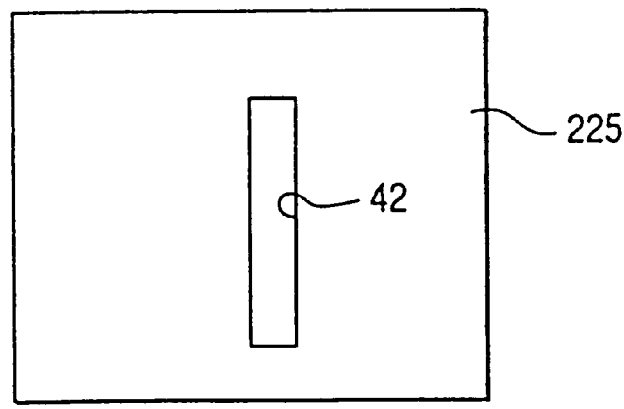

FIGS. 20 to 22 are plan views of modification.

The shape of slit in the slit plate can be modified. In FIG. 20, a squarer slit (through hole) 40 is formed in the slit plate 205. In FIG. 21, an L-shape slit (through hole) 41 is formed in the slit plate 215. In FIG. 22, a bar slit (through hole) 42 is formed in the slit plate 225.

Moreover, in the structure of the optical sensor of the first embodiment shown in FIG. 2, both slit plate 5 and the optical lens 4 are used to provide the light amount control function. However, either of the slit plate 5 or the optical lens 4 provides such a light amount control function. In other words, either of the slit plate 5 or the optical lens 4 can be omitted. Regarding the degree of freedom in designing the optical sensor, it is better that both the slit plate 5 and the optical lens 4 are provided.

Second Embodiment

Figure 23:
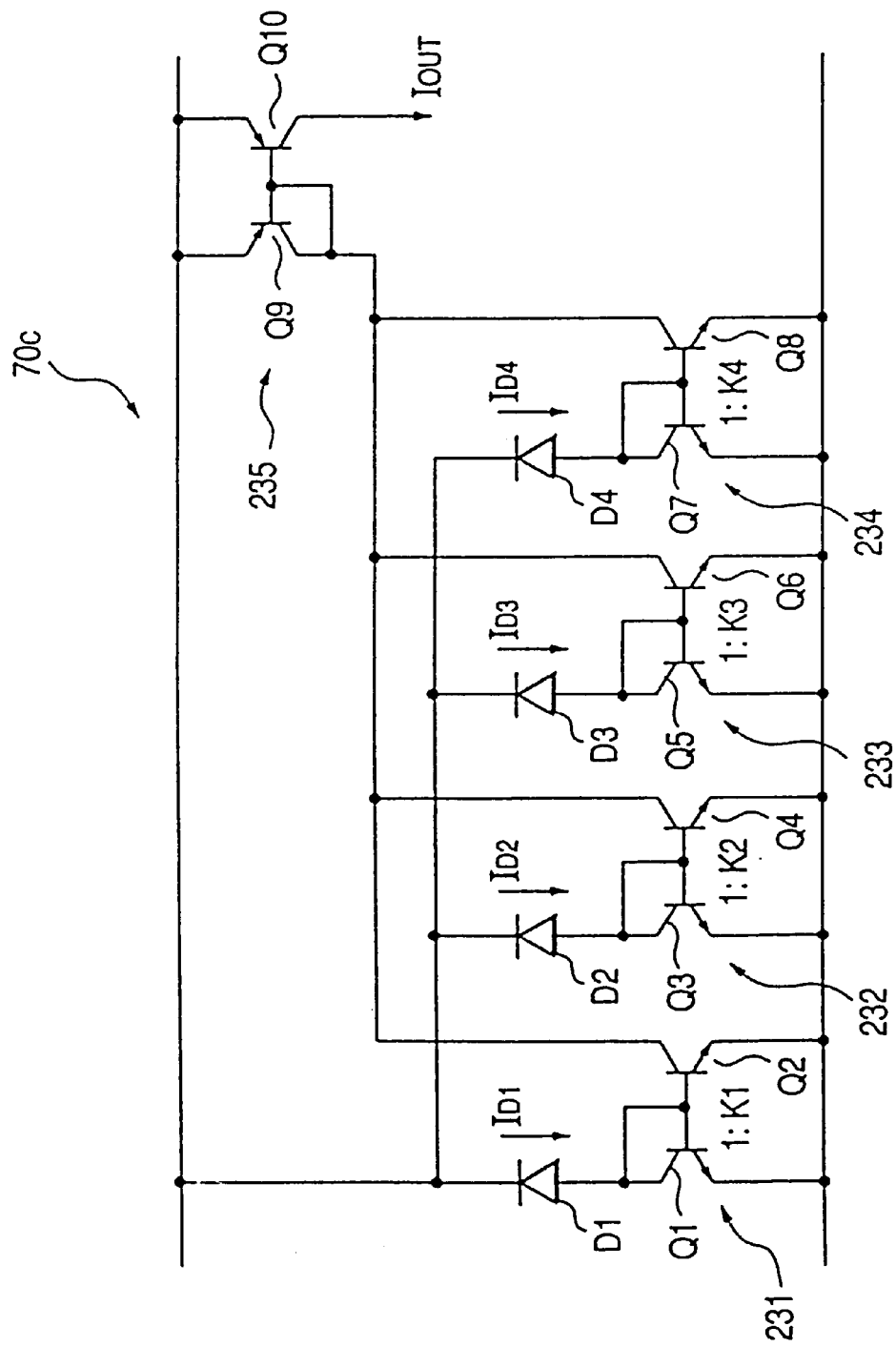
FIG. 23 is a schematic circuit diagram of a second embodiment.

FIG. 23 is a schematic circuit diagram of a second embodiment.

The optical sensor of the second embodiment is substantially the same as that of the first embodiment. The difference is in that a processing circuit 70c including current Miller circuits are provided instead the processing circuit 70a.

In the processing circuit 70c, the gains of detection signals are controlled by controlling a current Miller ratios in current Miller circuits.

In FIG. 23, the photodiode D1 is connected to a current Miller circuit 231 including transistor Q1 and Q2 to amplify the photocurrent $I_{D1}$ with the gain controlled. Similarly, the photodiode D2 is connected to a current Miller circuit 232 including transistor Q3 and Q4 to amplify the photocurrent $I_{D2}$ with the gain controlled. Moreover, the photodiode D3 is connected to a current Miller circuit 233 including transistor Q5 and Q6 to amplify the photocurrent $I_{D3}$ with the gain controlled. Further, the photodiode D4 is connected to a current Miller circuit 234 including transistor Q7 and Q8 to amplify the photocurrent $I_{D4}$ with the gain controlled. Moreover, emitters of the transistors Q1, Q3, and Q4 are connected to the ground and collectors of the transistors Q2, Q4, Q6, and Q8 are connected to collector of a transistor Q9 of a current Miller circuit 235 further including transistor Q10.

In the transistors Q2, Q4, Q6, and Q8, areas of emitters can be trimmed, so that adjusting the areas of emitters of the transistors Q2, Q4, Q6, and Q8 provides controlling current Miller ratios of the current Miller circuits 231 to 234. Actually, in the forming processing the sensor chip 3 of this embodiment, the areas of emitters of transistors Q2, Q4, Q6, and Q8 are differentiated. This adjustment provides the gains k1, k2, k3, k4 of detection signals from the photodiodes D1 to D4, wherein the gains are determined as similar to the first embodiment to provides the desired directivity shown in FIG. 14. The sensor signal $I_{OUT}$ can be adjusted by trimming a resistor (not shown) with a laser light.

As mentioned, in the second embodiment, the gains of detection signals from the photodiodes D1 to D4 are adjusted by trimming the areas of emitters of transistors Q2, Q4, Q6, and Q8 during the forming processing of the sensor chip to provide weighing to have the desired directivity.

Third Embodiment

Figure 24A:
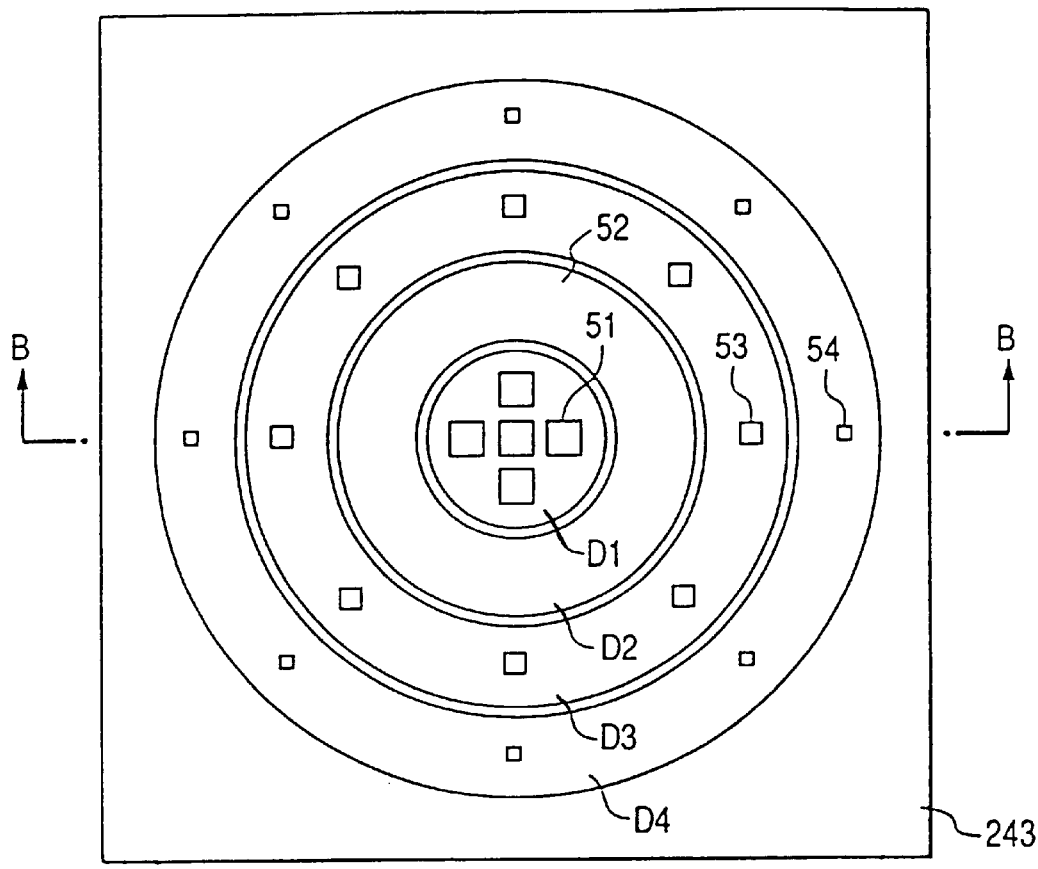
FIG. 24A is a plan view of a sensor chip of a third embodiment.
Figure 24B:
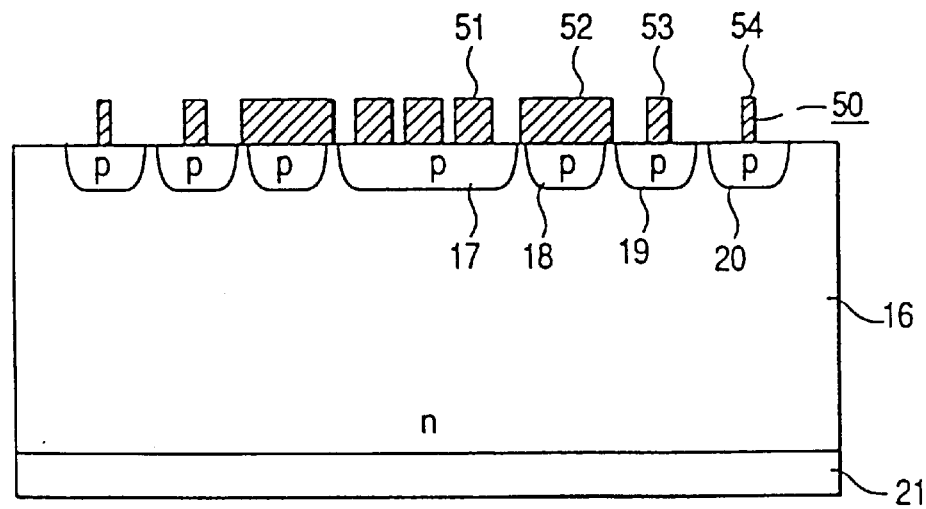
FIG. 24B is cross-sectional side view of the sensor chip shown in FIG. 24A taken on line B—B in FIG. 24A.

FIG. 24A is a plan view of a sensor chip of a third embodiment and FIG. 24B is cross-sectional side view of the sensor chip shown in FIG. 24A taken on line B—B. In the third embodiment, the sensitivities of photodiodes D1 to D4 are controlled by independently controlling amounts of light incident to respective photodiodes D1 to D4.

In FIG. 24A, as similar to the first embodiment, in a top surface layer of n-silicon substrate 16, a circular p-region 17 is formed and ring p-regions 18, 19, and 20 are formed therearound. On the bottom surface of the n-silicon substrate 16, a cathode electrode 21 is formed and anode electrodes 22, 23, 24, and 25 are provided on the p-regions 17, 18, 19, and 20. Therefore, the photodiode D1 is formed at the p-region 17, the photodiodes D2 is formed at the p-region 18, the photodiode D3 is formed at the p-region 19, and the photodiodes D4 is formed at the p-region 20, so that when light hits the respective regions 12 to 15, the detection signals (photocurrents) are generated in accordance with the amounts of light.

Moreover, aluminum films 51, 51, 52, 53, and 54 are respectively formed on the photodiodes D1, D2, D3, and D4 such that a ratio of magnitudes of photocurrents $I_{D1}$, $I_{D2}$, $I_{D3}$, and $I_{D4}$ become 1:0:3:5 when light is incident thereto equivalently. The aluminum film 50 is formed by depositing aluminum and unnecessary portions are removed by etching.

As mentioned, the sensitivities of photodiodes D1 to D4 are weighted by forming the aluminum films 51 to 54 which is opaque to adjust the ratio of the magnitudes of photocurrents $I_{D1}$, $I_{D2}$, $I_{D3}$, and $I_{D4}$. The ratio is controlled by the existence and in existence of the aluminum film 50 on the light receiving areas of photodiodes D1 to D4.

Figure 25A:
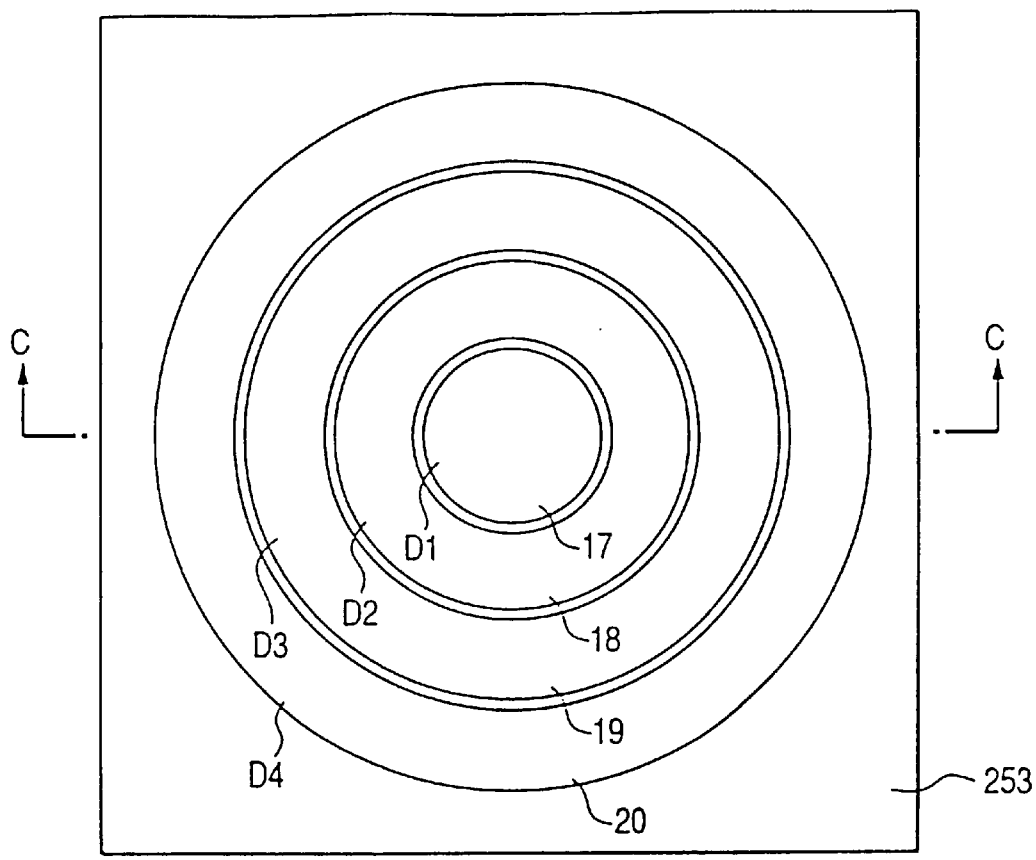
FIG. 25A is a plan view of a sensor chip of a third embodiment.
Figure 25B:
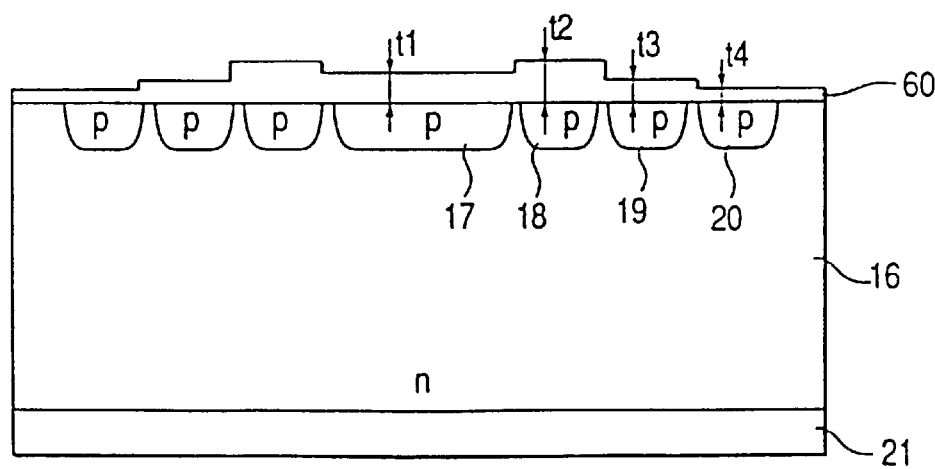
FIG. 25B is cross-sectional side view of the sensor chip shown in FIG. 25A taken on line C—C in FIG. 25A.

FIG. 25A is a plan view of a sensor chip of a third embodiment and FIG. 25B is cross-sectional side view of the sensor chip shown in FIG. 25A taken on line C—C.

On the top surface of the sensor chip 253, a silicon dioxide film 60 which is translucent is formed. Thicknesses t1 to t4 on the respective photodiodes D1 to D4 are different to control transmittances, wherein t2>t1>t3>t4. More specifically, the thicknesses t1, t2, t3, and t4 are determined to have the ratio of the photocurrents $I_{D1}$, $I_{D2}$, $I_{D3}$, and $I_{D4}$ 1:0:3:5 when light is incident thereto equivalently. The silicon dioxide film 60 may be partially formed with patterning as shown in FIG. 24A.

Figure 26A:
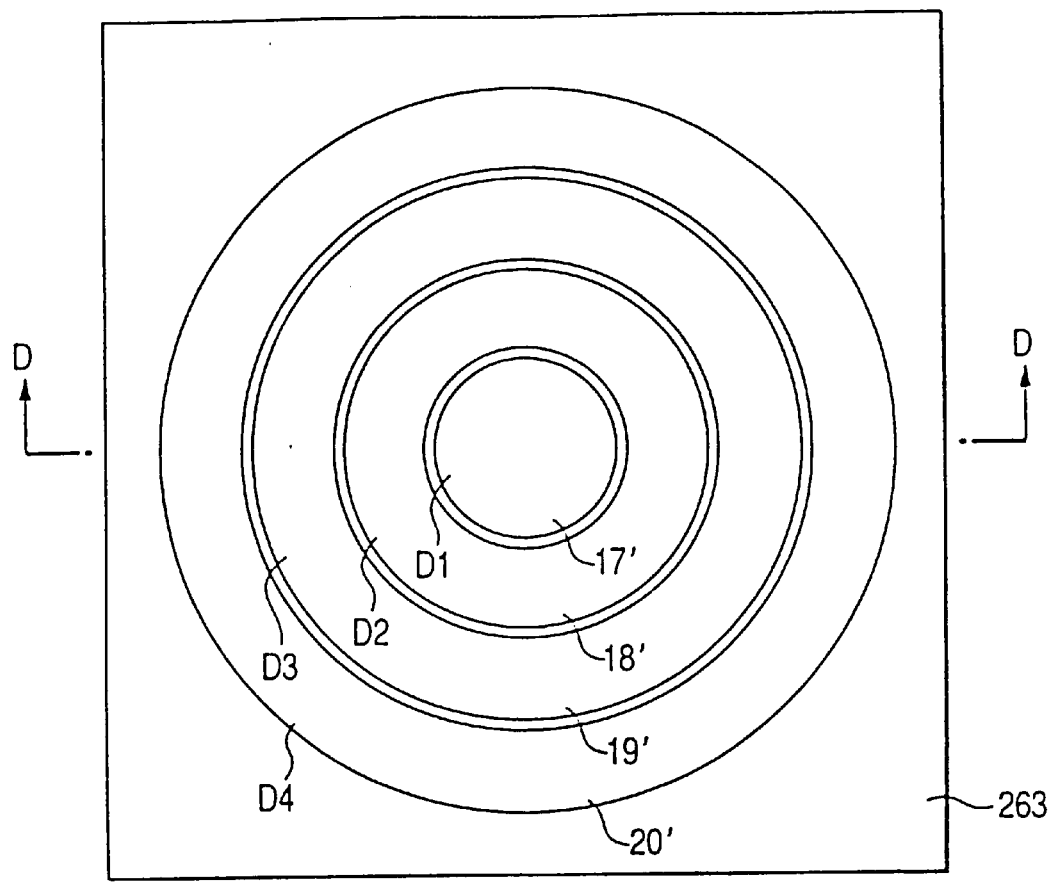
FIG. 26A is a plan view of a sensor chip of a third embodiment.
Figure 26B:
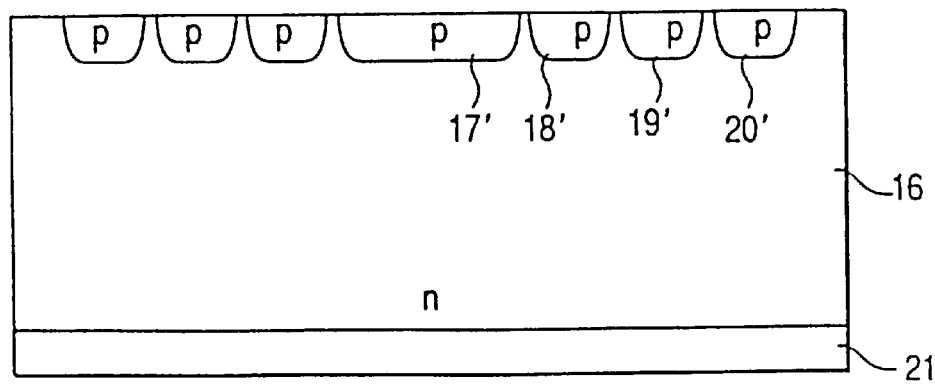
FIG. 26B is a cross-sectional side view of the sensor chip shown in FIG. 26A taken on line D—D in FIG. 26A.

FIG. 26A is a plan view of a sensor chip of a third embodiment and FIG. 26B is a cross-sectional view of the sensor chip shown in FIG. 26A taken on line D—D.

In a top surface layer of n-silicon substrate 16, a circular p-region 17' is formed and ring p-regions 18', 19', and 20' are formed therearound, wherein impurity amounts are differentiated to make the ratio of the photocurrents $I_{D1}$, $I_{D2}$, $I_{D3}$, and $I_{D4}$ 1:0:3:5 when light is incident thereto equivalently to weight the sensitivities of photodiodes D1 to D4.

In the above-mentioned embodiments, as the photodetectors, photodiodes D1 to D4 are used. However, other photodetectors such as phototransistors can be similarly used.

Another miniaturized optical sensor will be described.

This optical sensor is mounted on a vehicle as shown in FIG. 27 and used for controlling an air conditioner and a head lamp unit mounted on the vehicle. The air conditioner can independently control temperatures at both right and left front seats. That is, when a driver independently sets desired temperatures at both front seats, the air conditioner keeps at the desired temperatures at both front seats by controlling air temperatures and air flow rates at outlet openings for the right and left seats to compensate the sunlight affection. Moreover, the head lamp unit automatically turns on and off in accordance with head lamp control signal.

Fourth Embodiment

Figure 29:
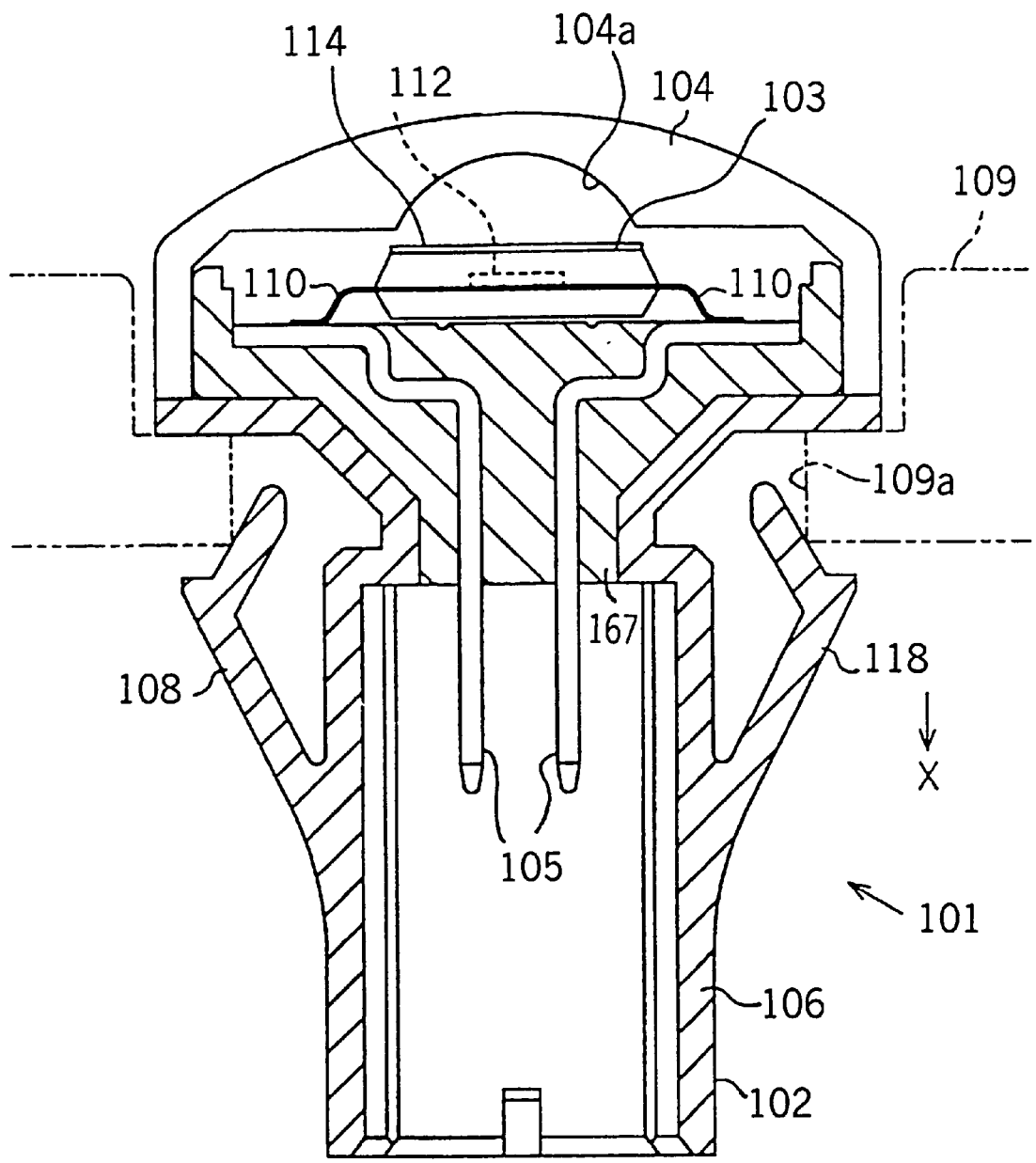
FIG. 29 is a cross-sectional side view of an optical sensor of a fourth embodiment.

FIG. 29 is a cross-sectional side view of the optical sensor 101 of the fourth embodiment. In FIG. 29, the optical sensor 101 includes a sensor housing 102 which also functions as a connector, a molded IC 103, an optical lens 104, and terminals 105, wherein more than two terminals 105 may be provided which are partially hidden in FIG. 29. The sensor housing 102 includes a case 106 and a holder 107 which are made of a plastic material. The case 106 has a sleeve portion and is used in an upright condition in the vehicle. The holder 107 is fitted into an upper inside portion of the case 106. The case 106 is commonly used among various types of vehicles and the shape of the holder 107 is changed in accordance with the specifications of the vehicles.

As shown in FIG. 29, ratchets 108 are provided on an outside peripheral surface of the case 106. The case 106 is inserted through a hole 109a in the dash panel 109 in the direction X, so that the optical sensor 101 is mounted on the dash panel 109 by forces generated by the ratchet 108 toward the edge of the hole 109a. At a middle of the upper surface of the holder 107, a molded IC 103 is fixed. The holder 107 has terminals 105 as a ground terminal, a power supply terminal, and output terminals for outputting the sensor signals or control signals. The terminals 105 are fixed in the holder 107 by insert molding. Ends of the terminals 105 are exposed at the upper surface of the holder 107 and the other ends are exposed at the lower surface of the holder 107.

The optical lens 104 is made of colored glass or a plastic (translucent material) and has a bowl shape; The optical lens 104 is fitted around the outer surface of the holder 107 and supported by the housing 102 above the molded IC 103. Moreover, at an inner surface (bottom surface of the optical lens 104, a hollow portion 104a is formed to provide a meniscus lens function. Moreover, other lens such as a Fresnel lens can be used to provide the meniscus lens function.

Figure 30:
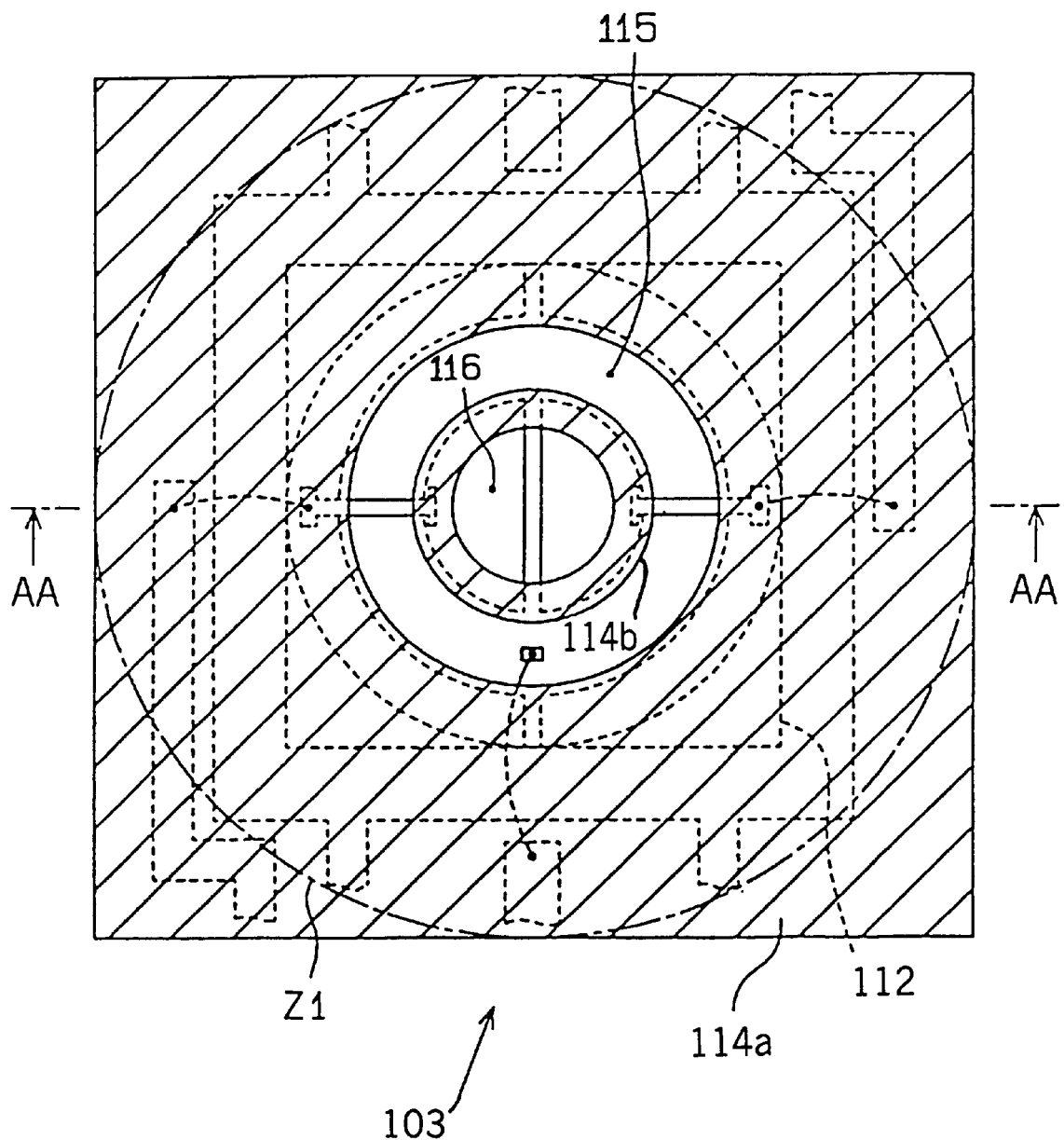
FIG. 30 is a plan view of the optical sensor of the fourth embodiment.
Figure 31:
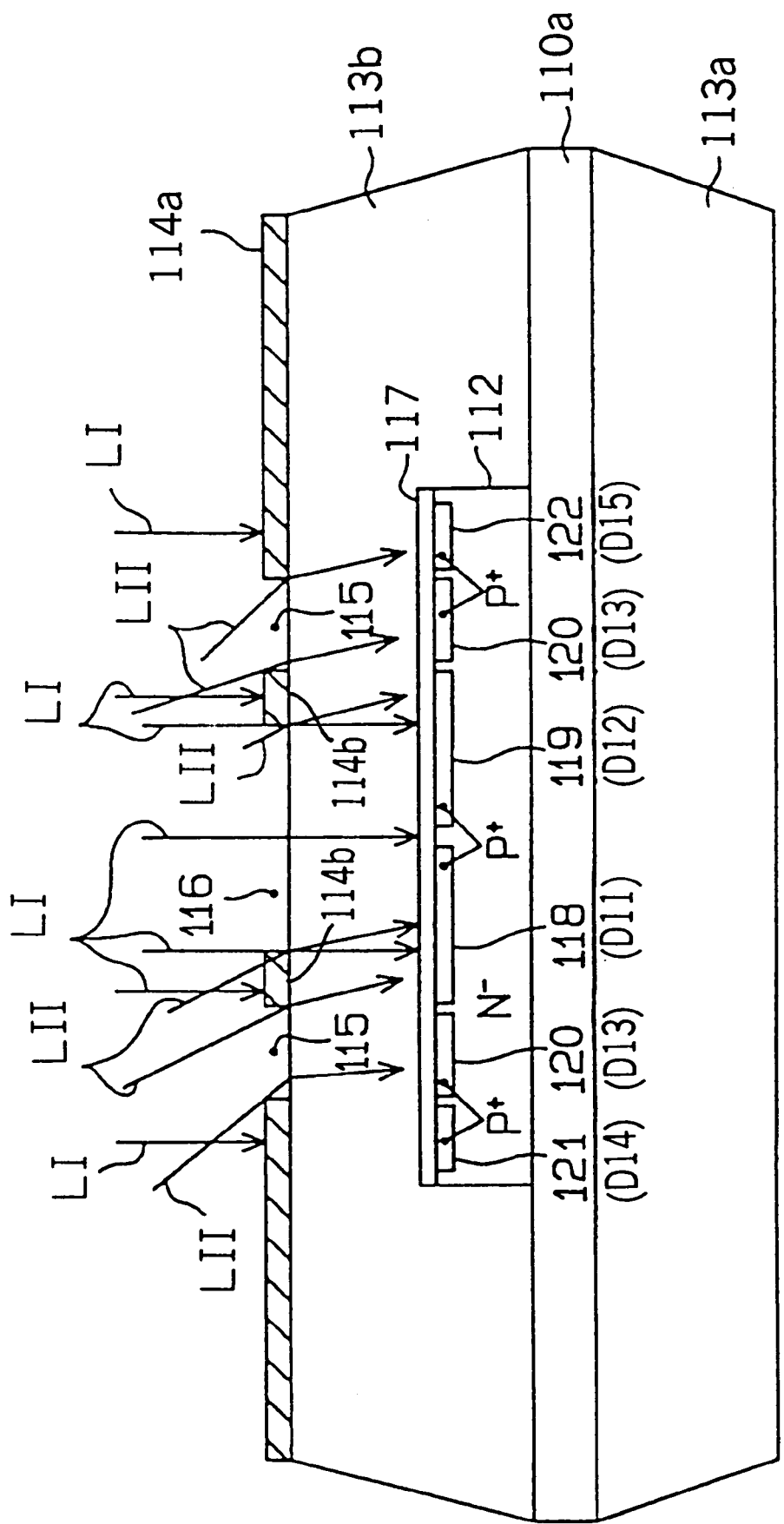
FIG. 31 is a cross-sectional side view of the molded IC according to the fourth embodiment taken on the line AA—AA in FIG. 30.

FIG. 30 is a plan view of the optical sensor 101 of the fourth embodiment. FIG. 31 is a cross-sectional side view of the molded IC 103 according to the fourth embodiment taken on the line AA—AA.

As shown in FIG. 31, on a die pad 110a, a sensor chip 112 is formed. The die pad 110a and the sensor chip 112 are molded with transparent molding material, so that molding layers 113a and 113b sandwiches the die pad 10a and the sensor chip 112. On the top surface of the molding layer 112b, opaque films 114a and 114b are formed with black resin by printing. The opaque films 114a and 114b have patterns for shading the light to control amounts of light incident to the sensor chip 112. That is, as shown in FIG. 30, the opaque (shading) film 114a having a large center hole is formed on the molding layer 113b and the opaque film 114b having a small center hole (window) 116 are arranged on the molding layer 113b inside the large hole of the opaque film 114a. That is, the opaque films 114a and 114b are coaxially arranged with a ring space 115 (window 115) and the small hole (window) 116. In this structure, light enters the sensor chip 112 through the windows 115 and 116.

As mentioned above, the optical lens 104 and the opaque films 114a and 114b (windows 115 and 116) provide a light amount controlling function which controls the light amount to the sensor chip 112 in accordance with an incident angle (elevation angle) of light and an orientation angle (mentioned later).

In FIG. 31, a top surface of the sensor chip 112 is covered with a protection film 17 such as $SiO_2$.

Figure 32:
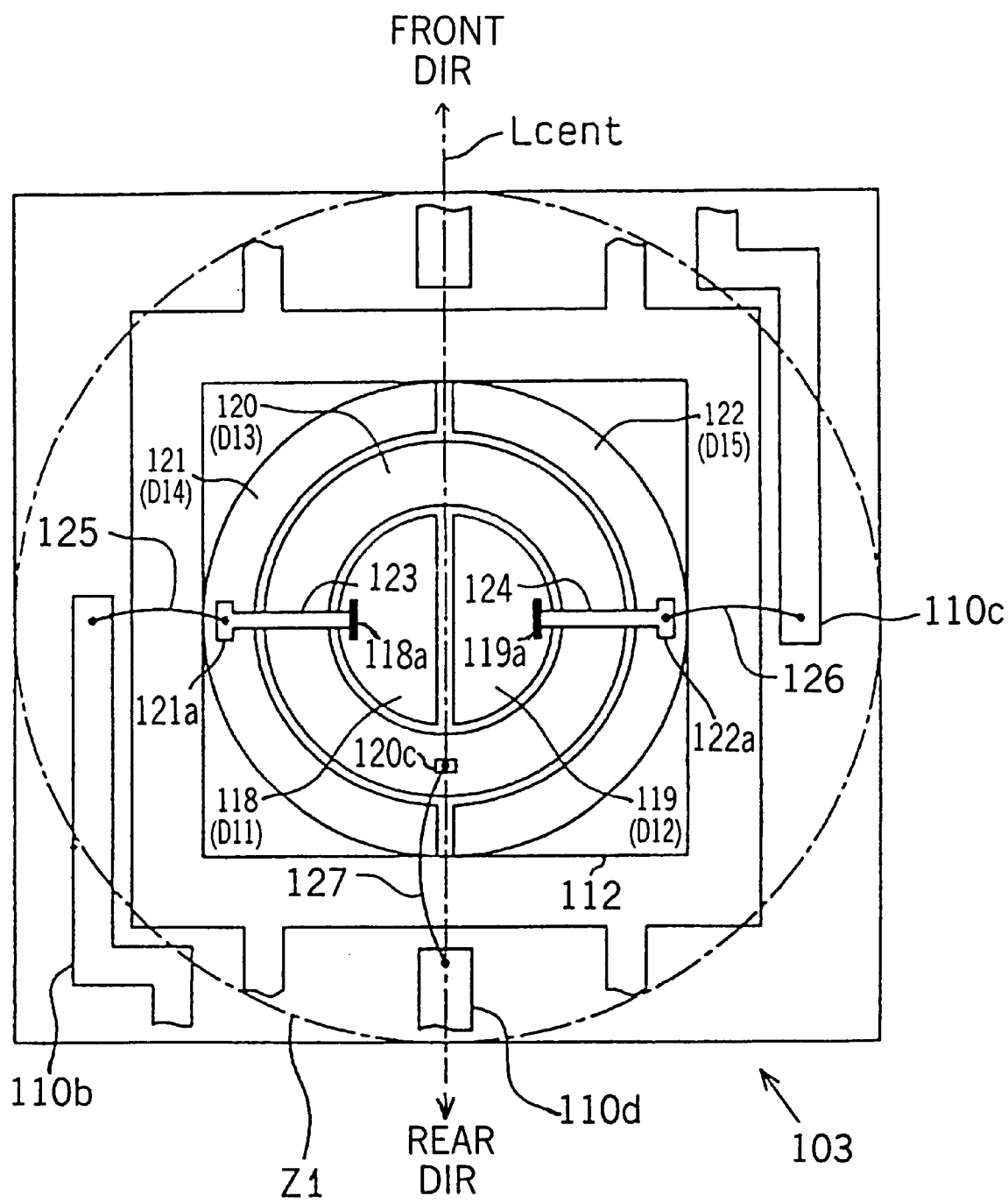
FIG. 32 is a plan view of the sensor chip of the fourth embodiment, wherein the opaque films shown in FIG. 31 are removed.

FIG. 32 shows a plan view of the sensor chip 112 of the fourth embodiment, wherein the opaque films 114a and 114b are removed.

Figure 33:
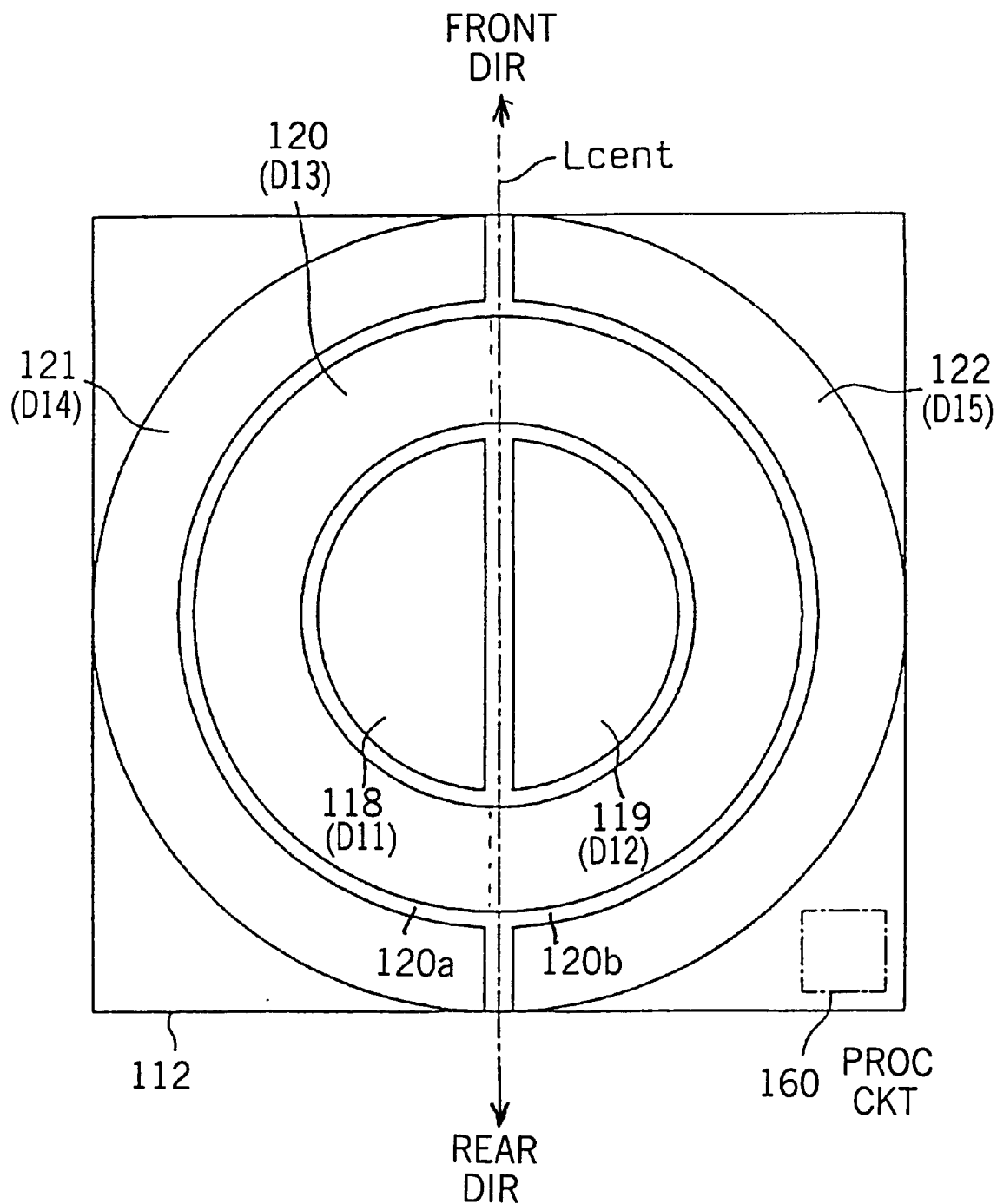
FIG. 33 is an enlarged plan view of the sensor chip according to the fourth embodiment, wherein interconnection is omitted.

At the center of the molded IC 103, the sensor chip 112 is arranged. FIG. 33 is an enlarged plan view of the sensor chip 112 according to the fourth embodiment, wherein interconnection is omitted.

The sensor chip 112 will be described more specifically. On $N^-$-type of the top surface of the sensor chip 112, $P^+$-type of semicircle regions 118 and 119 are formed at the center of the top surface of the sensor chip 112. Around the semi-circle regions 118 and 119, $P^+$-type of ring region 120 is formed. Moreover, $P^+$-type of semi-ring regions 121 and 122 are formed around the ring region 120. Respective regions 118 to 122 are electrically insulated.

The optical sensor 101 is mounted on a vehicle such that a center line Lcent corresponds to (agrees with) the direction of the vehicle mounting the optical sensor 101. The $P^+$-type of semicircle regions 118 and 119 are formed symmetrically with respect the center line Lcent. Moreover, the $P^+$-type of semicircle regions 121 and 122 are formed symmetrically with respect the center line Lcent. Further, diameters of the ring region 120 is arranged on the center line Lcent. That is, the pair of the semicircle regions 118 and 119, the ring region 120, and the pair of semi-ring region 121 and 122 are coaxially arranged. The $P^+$-type of semicircle region 118 provides a photodiode D11. The $P^+$-type of semicircle region 119 provides a photodiode D12. The $P^+$-type of ring region 120 provides a photodiode D13. The $P^+$-type of semicircle region 121 provides a photodiode D14. The $P^+$-type of semi-ring region 122 provides a photodiode D15. Accordingly, when light hits the $P^+$-type of semicircle regions 118 and 119, ring region 120, and semi-ring regions 121 and 122, photocurrents are generated in accordance with amounts of light incident to respective diodes D11 to D15. As mentioned above, photodiodes D11 to D15 are coaxially arranged on the sensor chip 12 as photoreceiving elements.

On the top surface of the $P^+$-type of regions 118 to 122, electrodes are formed respectively as anode electrodes. On the bottom surface of the sensor chip 112, a cathode electrode of respective diodes D11 to D15 are formed to provide a common electrode.

In FIG. 32, an electrode 118a of the $P^+$-type of semicircle region 118 is connected to an electrode 121a with an aluminium conductor 123 and an electrode 119a of the $P^+$-type of semicircle region 119 is connected to an electrode 122a with an aluminium conductor 124. Moreover, the electrode 121a (the aluminium conductor 123) is connected to a lead frame 110b with a bonding wire 125. Similarly, the electrode 122a (the aluminium conductor 124) is connected to a lead frame 110c with a bonding wire 126. Further, an electrode 120c on the $P^+$-type of ring region 120 is connected to a lead frame 110d with a bonding wire 127.

In FIGS. 30 and 32, chain lines Z1 represent the periphery of the hollow portion 104a of the optical lens 104.

In FIG. 33, it is possible to consider that the diode D13 may be provided by physically connecting diodes formed with semi-ring regions 120a and 120b. Moreover, it is also possible that the diode D13 may be provided by electrically connecting diodes formed with semi-ring regions 120a and 120b.

Figure 34:
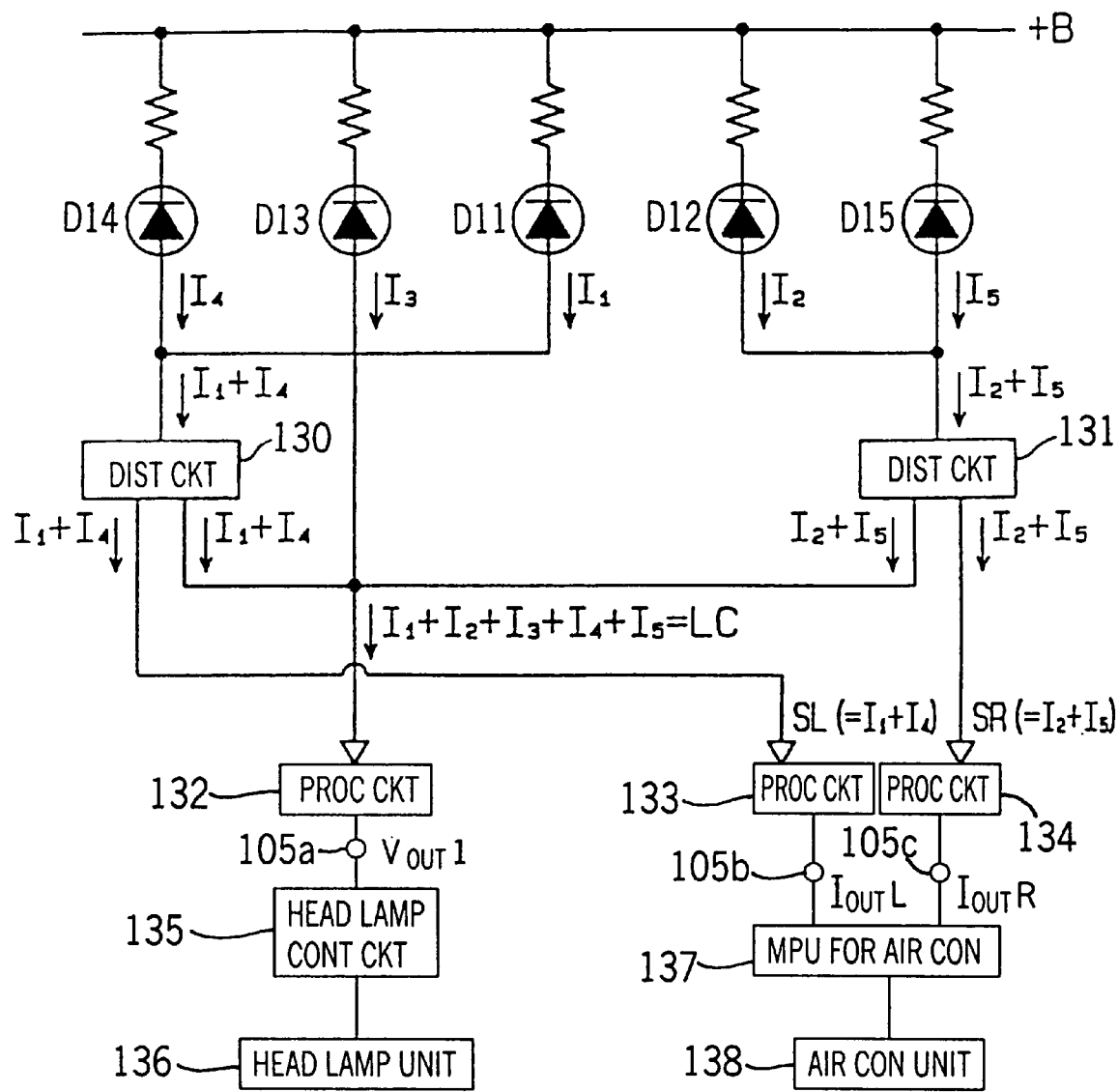
FIG. 34 is a schematic diagram of an electric circuit of the sensor chip according to the fourth embodiment.

FIG. 34 is a schematic diagram of an electric circuit of the sensor chip 112 according to the fourth embodiment.

The electric circuit of the sensor chip 112 includes the photodiodes D11 to D15, a distribution circuit 130 for distributing photocurrents I1 and I4 from the photodiodes D11 and D14, a distribution circuit 131 for distributing photocurrents I2 and I5 from photodiodes D12 and D15, a processing circuit 132 for processing photocurrents I1 to I5, a processing circuit 133 for processing the photocurrents I1 and I4, and a processing circuit 134 for processing the photocurrents I2 and I5, and output terminals 105a to 105c.

Cathodes of the photodiodes D11 to D15 are supplied with a positive potential B from the terminal 105. The anodes of the photodiodes D11 and D14 are connected to each other with the aluminum conductor 123 and connected to an input of the distribution circuit 130. Thus, the photocurrents I1 and I4 are summed in the aluminum conductor 123 and the summed signal (I1+I4) is supplied to the distribution circuit (for example, a current Miller circuit) 130. Moreover, the photocurrents I2 and I5 are summed in the aluminum conductor 124 and the summed signal (I2+I5) is supplied to the distribution circuit (for example, a current Miller circuit) 131. Further, the photocurrent I3 from the photodiode D13 is summed with the summed signals (I1+I4) and (I2+I5). This summed current LC (I1+I2+I3+I4+I5) is supplied to the processing circuit 132. The distribution circuit 130 supplies the summed current SL (=I1+I4) to the processing circuit 133. The distribution circuit 131 supplies the summed current SR (=I2+I5) to the processing circuit 134. The processing circuit 132 generates and outputs a head lamp control signal Vout1 at the terminal 105a. The processing circuit 133 generates and outputs an air conditioner control signal IoutL at the terminal 105b and the processing circuit 134 generates and outputs an air conditioner control signal IoutR at the terminal 105c.

The summed signals SR and SL provide data of amounts of light or light intensity on the side of the driver's seat and the side of the partner's seat. Thus, an orientation angle of the sunlight to the vehicle is detected from a ratio of SR/(SL+SR) or a ratio of SL/(SL+SR). Thus, the optical sensor acting as a sunlight sensor provides an elevation angle of the sunlight and an orientation angle of the sunlight with respect to the direction of the vehicle, wherein the current signals SR and SL represent amounts of light incident from the right and left directions of the vehicle. Moreover, a total amount of the light is detected from (SL+SR), i.e., (I1+I2+I4+I5) as a sunlight sensor.

On the other hand, the optical sensor 101 acting as the head lamp controller provides the sensor signal indicating the brightness at a high efficiency because all photodiodes D11 to D15 are used, so that the optical sensor 101 provides the sensor signal Vout1 even in a tunnel or at twilight.

More specifically, the photodiodes D11 to D15 are arranged coaxially and a part of photodetectors, i.e., the photodiodes D11 and D12 at the center of the sensor chip 112 and photodiodes D14 and D15 at peripheral of the sensor chip 112, are used for detecting the incident angle (elevation and orientation angles) and detecting the amounts of sunlight. On the other hand, the total amount of light is detected from the photodiodes D11 and D12 at the center of the sensor chip 112, the photodiodes D14 and D15 at the peripheral of the sensor chip 112, and the photodiodes D13 at the intermediate position of the sensor chip 112.

Accordingly, both light receiving regions for detecting incident angles of the sunlight and for detecting a light amount are provided with a smaller space, so that the optical sensor can be miniaturized.

The sensor signals Vout1, IoutL, and IoutR from the processing circuits 132 to 134 are supplied to external circuits. More specifically, the processing circuit 132 is connected to a head lamp control circuit 135 which controls turning on and off of the head lamp unit 136. The processing circuit 133 and 134 are connected to a microprocessor 137 which controls an air conditioner (air condition unit) 138. More specifically, the air control unit 138 includes a blower, a cooler, a heater, etc. and is mounted inside the dash panel 10. The microprocessor 137 controls the air condition unit 138 in accordance with amounts of light in the right and left directions of the vehicle to increase a flow rate of cool air from the cooler to decrease the temperature at the sunny side of seats.

In these circuits, the orientation angle is detected from the sum of the photocurrents I1 and I4 and the sum of the photocurrents I2 and I5, wherein weighting coefficients are 1. However, as mentioned earlier, the weighting coefficients may be varied. For example, weighting coefficients (gains) of the photocurrents I1 and I2 may be one and those of photocurrents I4 and I5 may be three to obtain a desired detection characteristic. Moreover, in detecting the orientation angle of the sunlight, the photocurrent I3 is not used. This means that the weighting coefficient (gain) for the photocurrent I3 is zero in these circuits.

Figure 35:
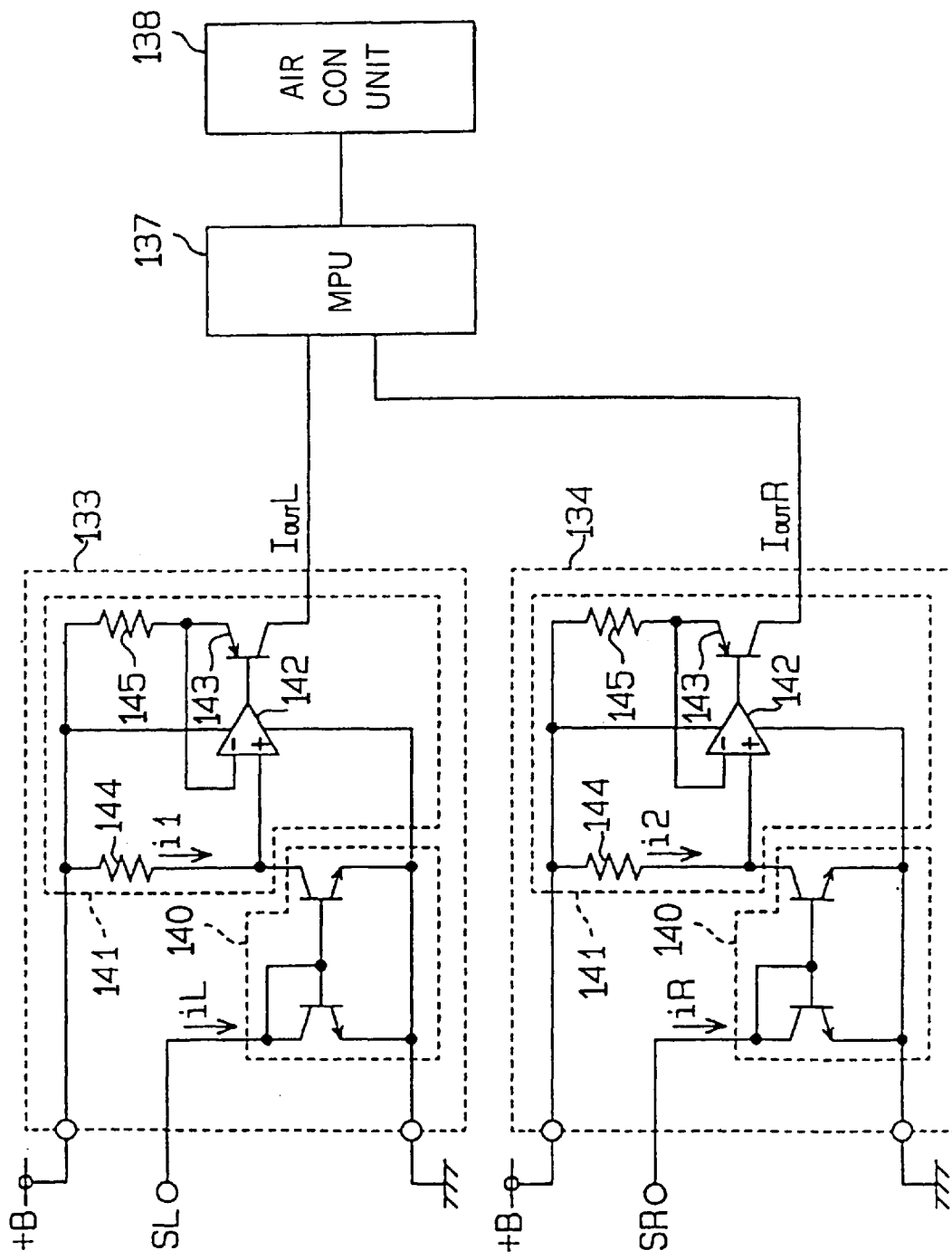
FIG. 35 is a schematic circuit diagram of the processing circuits according to the fourth embodiment.
Figure 36:
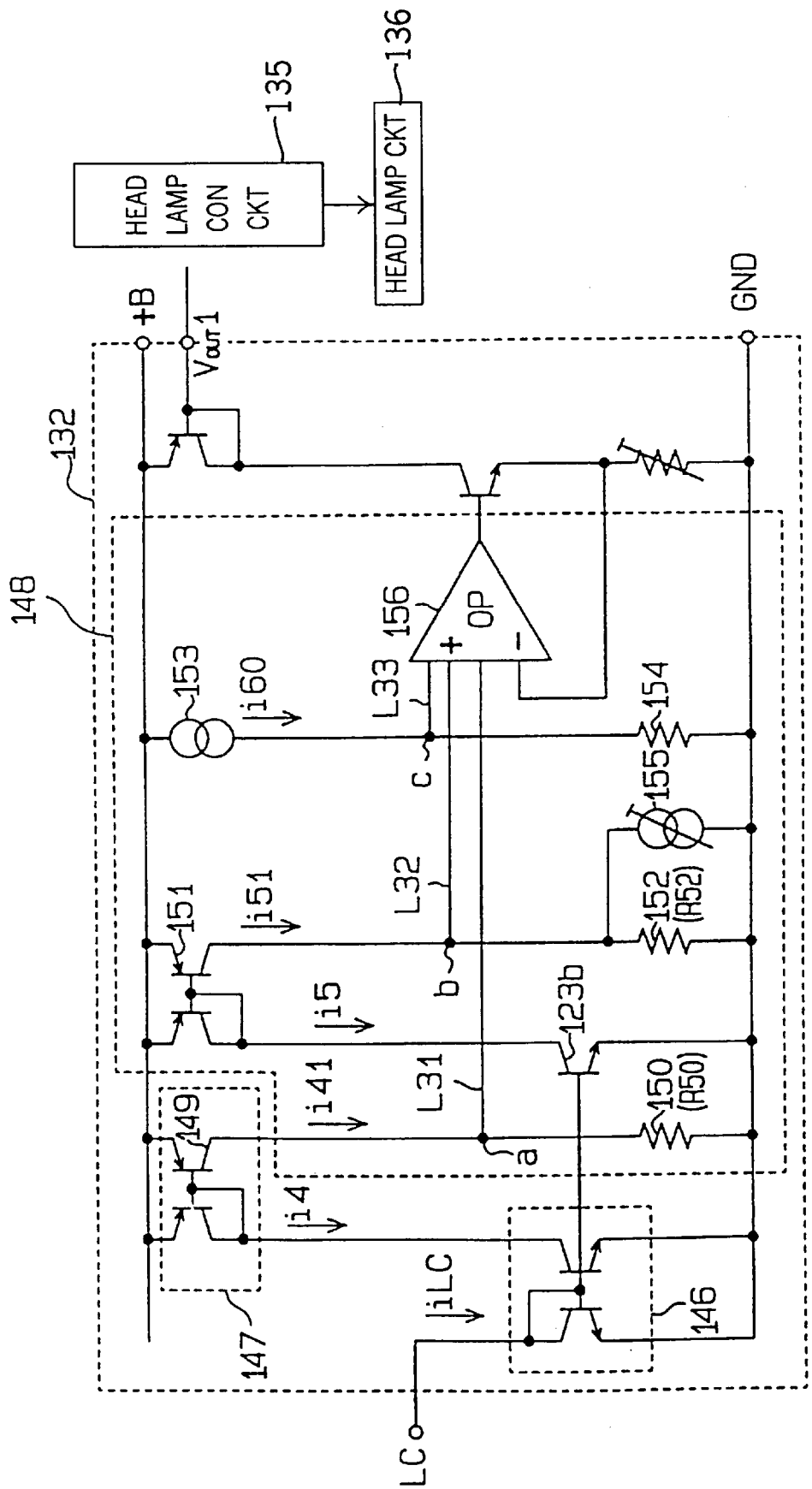
FIG. 36 is a schematic circuit diagram of the processing circuit shown in FIG. 34.

FIG. 35 is a schematic circuit diagram of the processing circuits 133 and 134 according to the fourth embodiment and FIG. 36 is a schematic circuit diagram of the processing circuit 132 shown in FIG. 34.

Each of the processing circuits 133 and 134 includes a current Miller circuit 140 and a process circuits 141. The current miller circuits 140 generate currents i1 and i2 which are proportional to the input current iL and iR, respectively. The process circuits 141 amplify the currents i1 and i2, respectively. More specifically, the process circuits 141 include operational amplifiers 142, transistors 143, and resistors 144 and 145 to generate and output current signals IoutL and IoutR which are proportional to currents i1 and i2, respectively.

In FIG. 36, the processing circuit 132 includes current Miller circuits 146 and 147, and a compensation circuit 148. The compensation circuit 148 includes a resistor 150 connected in series to the transistor 149 of the current Miller circuit 147, a series circuit including a transistor 151 and a resistor 152, and a series circuit including a constant current circuit 153 and a resistor 154. Moreover, a constant current circuit 155 is connected to a resistor 152 in parallel. The resistance R50 of the resistor 150 is greater than the resistance R52 of the resistor 152 (R50>R52). Connecting points a, b, and c of the respective series circuits are connected to inputs of a three-input operational amplifier 156. The three-input operational amplifier 156 has a function for outputting the lowest value from the three input values.

The current Miller circuits 146 and 147 generate a current i4 which is proportional to the current LC and a current i41 which is also proportional to the current i4. The current 141 generates a voltage drop across the resistor 150 which is inputted to the operational amplifier 156. Moreover, a current i5 which is also proportional to the current LC and a current i51 which is also proportional to the current i5 are further generated. A voltage drop by the current i51 across the resistor 152 is supplied to the operational amplifier 156. Further, a constant current i60 generated by a constant current circuit 153 generates a voltage drop across the resistor 154 which is also supplied to the operational amplifier 156.

Figure 37A:
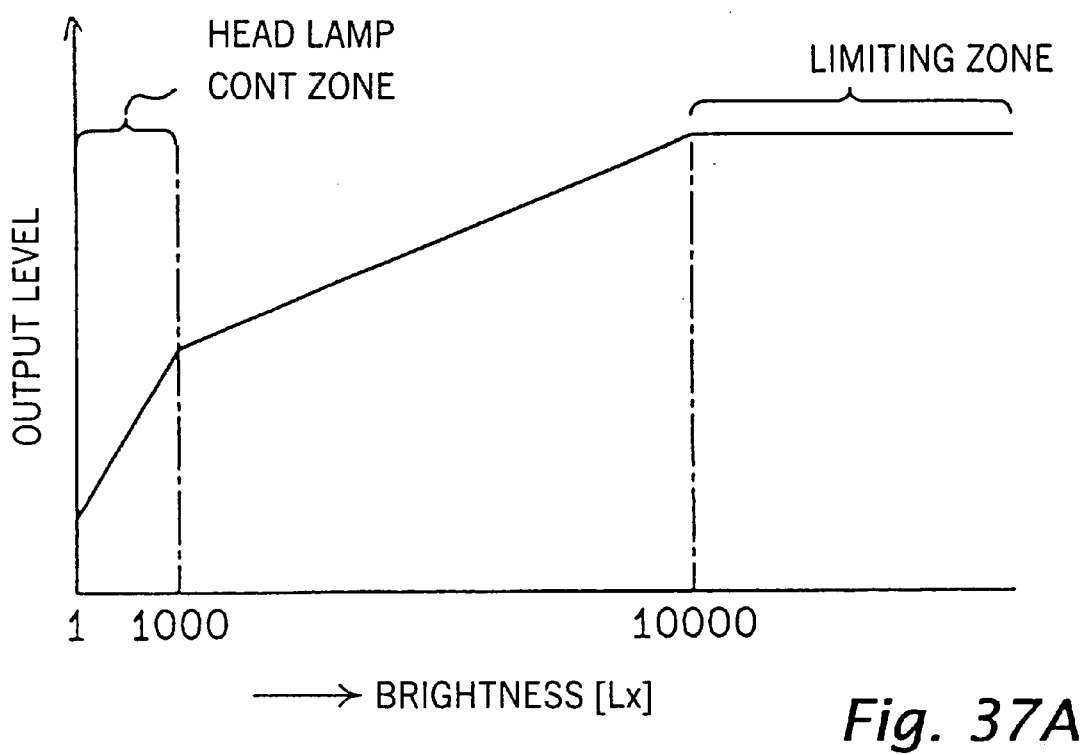
FIGS. 37A and 37B are graphical drawings of the fourth embodiment showing a desired characteristic curve and curves for generating the desired characteristic curves.
Figure 37B:
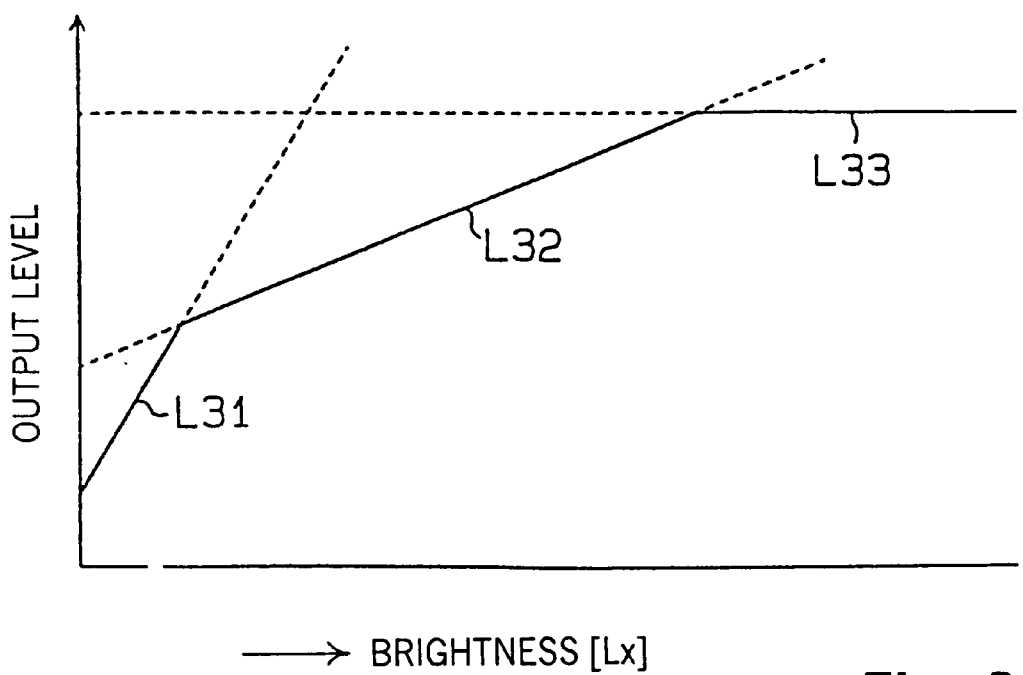

FIGS. 37A and 37B are graphical drawing of the fourth embodiment showing a desired characteristic curve and curves for the desired characteristic curves.

In FIG. 37B, the current i41 provides a characteristic line L31, the current i51 provides a characteristic line L32, and the constant current i60 provides the characteristic line L33. The inclination of the characteristic line L31 is greater than that of the characteristic line L32 because R50>R52.

As mentioned above, the three-input operational amplifier 156 outputs one of input values which is lowest, so that a characteristic derived from the characteristic line L31, L32, and L33 wherein the lowest value is selected.

As mentioned above, the output characteristic of the optical sensor 101 with respect to brightness is provided with three curves having different inclinations as shown in FIG. 37B. Accordingly, at a low brightness zone in the sensor signal, that is, at a head lamp controlling zone, the inclination of the characteristic curve is high, so that a surer control of turning on and off at twilight is provided.

The processing circuits 132, 133, and 134 shown in FIGS. 35 and 36 can be formed in the sensor chip 112. For example, a processing circuit 60 is arranged outside the photodiodes D4 ad D5. When the signal processing circuit 60 is formed on the same substrate with the photodiodes D11 to D15, the number of bonding wires can be reduced.

Operation of the optical sensor 101 will be described.

In FIG. 29, light incident to the top surface of the optical lens 104 enters the optical lens 4 which bends light path of the light to allow incident light at a lower elevation angle to enter the optical sensor 112. The opaque films 114a and 114b are provided to increase directivity of sensor chip 112. Light passing through windows 116 and 115 enters photodiodes D11 to D15. The photodiodes D11 to D15 generate detection signals. More specifically, light entering the top surface of the optical lens 104 is bent by the refraction index of the optical lens 104 and the curvatures of the top surface and the bottom surface of the optical lens 4, so that the optical lens 4 introduces light to the sensor chip 112. Above the sensor chip 112, there are the opaque films 114a and 114b, parts of the light from the optical lens 4 reach the sensor chip 112 through the windows 115 and 116.

In FIG. 29, a radius of the curvature of the bottom surface of the optical lens is smaller than that of the top surface of the optical lens 104 to provide a meniscus structure. Thus, when light enters the optical lens 104 in the horizontal direction, i.e., at an elevation angle of nearly zero, light can be introduced into the sensor chip 12 at from a low to high elevation angles.

When light enters at an elevation angle of 90°, light passes through the windows 15 and 16 and reaches the sensor chip 112 around the center of the photodiodes D11 to D15.

When light incoming at a low elevation angle in the right or left direction, a larger amount of light hits either of both sides of the center line Lcent than the other side, wherein the side is opposite to the incoming direction of the light. In FIG. 31, light L1 incoming at an elevation angle of 90° hits portions of the sensor chip 112 just under the windows 115 and 116. On the other hand, light L2 incoming at a low elevation angle in the left direction (in the drawing) hits portions which is shifted in the right (in the drawing) from the portions hitted by the light L1. Accordingly, the ratio of light entering respective photodiodes varies with the elevation angle and the orientation angle.

As mentioned above, light is received by the photodiodes D11 to D15 to generate detection signals representing amounts of light. Then, the processing circuit 132 receives the total photocurrents LC (=I1+I2+I3+I4+I5) of photodiodes D11 to D15. The processing circuit 133 receives the photocurrents SL (=I1+I4). The processing circuit 134 receives the photocurrent SR (=I2+I5). The processing circuits 132, 133, and 134 generate the sensor signals Vout1, IoutL, and IoutR. The microprocessor 137 for the air-conditioner 138 detects the orientation angle (left and right directions of the vehicle) and the amount of the sunlight to perform independent air condition controlling between the driver's seat and the partner's seat. Moreover, the head lamp control circuit 135 controls turning on and off in accordance with the sensor signal Vout1, so that, for example, when the vehicle enters a tunnel, the head lamp unit 136 turns on and when the vehicle exits the tunnel, the head lamp unit 136 turns off.

Figure 38:
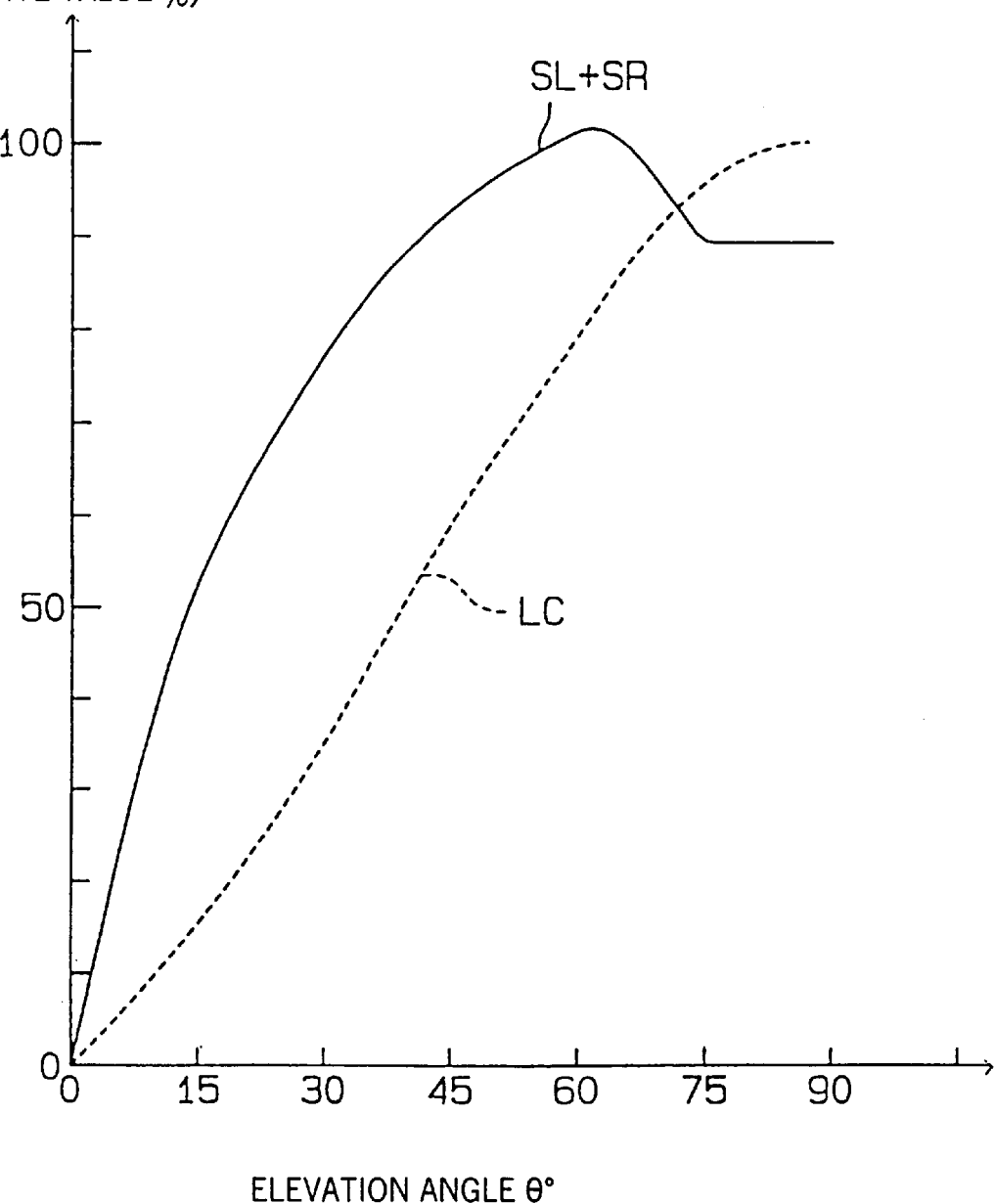
FIG. 38 is a graphical drawing of the fourth embodiment showing output characteristic curves of the sensor signals with respect to elevation angles θ°.

FIG. 38 is a graphical drawing of the fourth embodiment showing output characteristic curves of the sensor signals (relative values) with respect to elevation angles θ°.

In FIG. 38, the solid line (SL+SR=I1+I2+I4+I5) shows a peak around elevation angle of 60°. On the other hand, at low elevation angles, the intensities of the photocurrents are low. This characteristic corresponds to the heat-load characteristic of the air conditioners which depends on the shape of the vehicle, particularly, the shape of the front shield glass.

The characteristic curve denoted by a chain line LC in FIG. 38 represents sensor output LC (=I1+I2+I3+I4+I5). In this characteristic curve, the sensitivity (photocurrent intensity) is low at low elevation angles and high at high elevation angles. This characteristic curve provides a desirable head lamp controlling.

FIG. 39 is a graphical drawing of the fourth embodiment showing an incident orientation angle characteristic of the photocurrents (the ratio of photocurrents) with respect to the absolute orientation angle (orientation angles in the right and left directions from the center line Lcent).

In FIG. 39, at the orientation angle of 0°, the ratio of the right side (SL/(SL+SR) and the ratio of the left side (SR/(SL+SR) are 0.5, which means both ratios balance with each other. With increase in the orientation angle in the right direction, the ratio SL/(SL+SR) increases and with increase in the orientation angle in the left direction, the ratio SR/(SL+SR) decreases. The orientation angle of the sunlight is detected in accordance with these characteristic curves.

As mentioned above, according to the fourth embodiment, a plurality of photodiodes D11 to D15 are formed at the light receiving area on the sensor chip 112, wherein opaque films 114a and 114b are formed above the sensor chip 112 to obtain data of the incident angle of the sunlight. A first function signals (the sensor signals IoutL and IoutR) regarding at least incident angle of the incident light are obtained from a part of the photodiodes (D11, D12, D14, and D15). Moreover, the pair of photodiodes D11 and D12 and the pair of photodiodes D4 and D5 are arranged on the both sides of the center line Lcnet to provide data of the right and left sunlight incoming directions from the front direction of the vehicle. Further, a second function signal (the sensor signals Vout1) regarding a total amount of the incident light is obtained from the other photodiode (D13) and the part of the photodiodes (D11, D12, D14, and D15). The first and second function signals are selectively used to generate the sensor signals IoutL and IoutR for controlling an air conditioner 138 of the vehicle and the sensor signal Vout1 for controlling turning on and off of the head lamp unit 136.

Moreover, the second function signal surely provides data of the brightness of the circumference of the vehicle even at twilight condition.

As mentioned above, the first function signal requires a larger amount of the sunlight in generating and the second function signal requires a smaller mount of the sunlight in generating. These first and second function signals are selectivity generated from the photodiodes D11 to D15 on the same sensor chip 112 by the respective processing circuits 132 to 134, so that miniaturization of the optical sensor is provided.

In the fourth embodiment, the photodiodes are arranged within three coaxial arranged circles. However, it is also possible to form the sensor chip with photodiodes arranged within more than three coaxially arranged circles.

In the fourth embodiment, photodiodes D11 to D15 are used. However, it is also possible to provide a sensor chip with phototransistors.

Moreover, a plurality of photodiodes D11 to D15 are formed within one sensor chip. However, it is also possible to form the similar optical sensor by arranging different chips on the light hitting area, each includes one photodetecting element.

In the fourth embodiment, the sensor chip 112 is formed as the molded IC 103. However, it is also possible that the sensor chip 112 is mounted as a bare chip structure similar to the first embodiment.

In FIGS. 31 to 33, it is assumed that the photodiode D13 is divided with respect to the center line Lcent. A pair of photodiodes as first right and left photodiodes D11 and D12 having semicircle shapes, a second pair of photodiodes 120a and 120b as second right and left photodiodes having a semi-circles, and third pair of photodiodes D14 and D15 as third right and left photodiodes are formed on the sensor chip 112. The first to third right photodiodes are arranged symmetrically with the first to third left photodiodes, respectively, regarding a direction on a plane on which the photodiodes are arranged. The processing circuit 131 and the distribution circuit 134 generate a right side direction sensor signal SR from at least one of the first to third right photodiodes D12, 120b, and D15. The processing circuit 132 and the distribution circuit 130 generates a left side direction sensor signal from at least one of the first to third left photodiodes D11, 120a, and D14. The processing circuit 132 generates the second sensor signal from the first to third pairs of photodiodes D11 to D15. The photodiodes 120a and 12b are physically or electrically connected.

The opaque film (ring) 114b is arranged Just above peripheral portions of the first pair of photodiodes D11 and D12 to prevent the light from entering the first pair of photodiodes D11 and D12 at a right elevation angle. The opaque film (ring) 114b is arranged Just above the third pair of photodiodes D14 and D15 to prevent the light from entering the third pair of photodiodes D14 and D15 at a right elevation angle.

What is claimed is:

1. An optical sensor comprising:
   optical detecting means including a plurality of photodetectors for receiving light and generating detection signals;

light amount controlling means arranged above said optical detecting means for controlling amounts of said light to said photodetectors in accordance with an incident angle of said light; and weighting means for respectively weighting sensitivities of said photodetectors and outputting a weighted detection signal from said detection signals, wherein a characteristic of said weighted detection signal varies in accordance with said incident angle; wherein:

said weighting means comprises film means on said optical detection means for controlling light transmittances of portions of said film means above respective photodetectors.

2. An optical sensor as claimed in claim 1, wherein said weighting means comprises a signal processing circuit for controlling gains of said detection signals.

3. An optical sensor as claimed in claim 1, wherein said film means comprises opaque film means on said optical detection means for controlling amounts of said light to respective photodetectors by controlling ratios between existence and inexistence of said opaque film means per a unit area on portions of said film means above respective photodetectors.

4. An optical sensor as claimed in claim 1, wherein said film means comprises a translucent film controlling said light transmittance by controlling thicknesses of said portions of said translucent film above respective photodetectors.

5. An optical sensor as claimed in claim 1, wherein said light amount controlling means comprises a meniscus lens.

6. An optical sensor as claimed in claim 1, wherein said photodetectors respectively have different output characteristics in response to the same amount of said light.

7. An optical sensor as claimed in claim 1, wherein said photodetectors are arranged coaxially.

8. An optical sensor as claimed in claim 7, wherein said photodetectors are arranged on a plane surface of said optical sensor, said optical sensor further comprising an outputting circuit for outputting one of said detection signals from one of said photodetectors arranged closest to the center of said photodetectors coaxially arranged as a first sunlight amount detection signal indicative of a first amount of said light having a first directivity, wherein said weighting means comprises a signal processing circuit for controlling gains of said detection signals and outputting a second sunlight amount signal indicative of a second amount of said light having a second directivity.

9. An optical sensor as claimed in claim 7, wherein one of said photodetectors arranged closest the center of said photodetectors is apart from the other photodetectors by a predetermined interval and said weighting means comprises a signal processing circuit arranged between said one of said photodetectors and the other photodetectors.

10. An optical sensor as claimed in claim 7, wherein said photodetectors are arranged on a plane surface of said optical sensor, and wherein said light amount controlling means controls said amounts of said light to said photodetectors such that said detection signals from a first portion of photodetectors other than a second portion of said photodetectors closest to a center of said coaxially arranged photodetectors show a first set of magnitudes when said incident angle is substantially zero and show a second set of magnitudes when said incident angle is apart from zero which are respectively lower than said first sets of magnitudes.

11. An optical sensor as claimed in claim 7, wherein said photodetectors are arranged on a plane surface of said optical sensor, and wherein said light amount controlling means has shading means for shading a portion of said light to a first portion of said photodetectors other than a second portion of said photodetectors closest to a center of said coaxially arranged photodetectors when said incident angle is substantially zero.

12. An optical sensor as claimed in claim 7, wherein said detection signals of a plurality of said photodetectors are summed to generate a first function signal and are combined to provide a second function signal, said first function signal is provided to control an air conditioner of a vehicle mounting said optical sensor, and said second function signal is provided to control turning on and off of a head lamp unit of said vehicle.

13. An optical sensor as claimed in claim 12, wherein said first function signal is obtained by using a part of a plurality of said photodetectors and said second function signal is obtained by using all of a plurality of said photodetectors.

14. An optical sensor as claimed in claim 13, wherein said optical sensor further comprises a semiconductor chip including a plurality of said photodetectors, said first function signal is obtained from a first one of said photodetectors arranged at a center of said photodetectors and a second one of said photodetectors arranged at the most outer peripheral position of said photodetectors, and said second function signal is obtained from all of a plurality of said photodetectors.

15. An optical sensor as claimed in claim 1, wherein said detection signals of a plurality of said photodetectors are summed to generate a first function signal and are combined to provide a second function signal, said first function signal is provided to control an air conditioner of a vehicle on which said optical sensor is mounted, and said second function signal is provided to control turning on and off of a head lamp unit of said vehicle.

16. An optical sensor as claimed in claim 15, wherein said first function signal is obtained by using a part of a plurality of said photodetectors and said second function signal is obtained by using all of a plurality of said photodetectors.

17. An optical sensor as claimed in claim 16, wherein said optical sensor further comprises a semiconductor chip including a plurality of said photodetectors which are coaxially arranged with each other, said first function signal is obtained from first one of said photodetectors arranged at a center of said photodetectors and second one of said photodetectors arranged at the most outer peripheral position of said photodetectors, and said second function signal is obtained from all of a plurality of said photodetectors.

18. An optical sensor comprising:

optical detecting means including a plurality of photodetectors for receiving light and generating detection signals;

light amount controlling means arranged above said optical detecting means for controlling amounts of said light to said photodetectors in accordance with an incident angle of said light; and signal generation means for generating a first function signal regarding at least an incident angle of said light from one part of a plurality of said photodetectors and generating a second function signal regarding a total amount of said light from another part of photodetectors including said one part of a plurality of said photodetectors, wherein said detection signals of a plurality of said photodetectors are summed to generate said first function signal and are combined to provide said second function signal, said first function signal is provided to control an air conditioner of a vehicle on which said optical sensor is mounted, and said second function signal is provided to control turning on and off of a head lamp unit of said vehicle, and wherein said first function signal is obtained by using a part of a plurality of said photodetectors and said second function signal is obtained by using all of a plurality of said photodetectors.

19. An optical sensor as claimed in claim 18, wherein said optical sensor further comprises a semiconductor chip including a plurality of said photodetectors which are coaxially arranged with each other, said first function signal is obtained from a first one of said photodetectors arranged at a center of said photodetectors and a second one of said photodetectors arranged at the most outer peripheral position of said photodetectors, and said second function signal is obtained from all of a plurality of said photodetectors.

20. An optical sensor as claimed in claim 19, wherein said optical sensor further comprising weighting means for respectively weighting sensitivities of said photodetectors and outputting a weighted detection signal from said detection signals, wherein a characteristic of said weighted detection signal varies in accordance with said incident angle, wherein said weighting means comprises a signal processing circuit for controlling gains of said detection signals.

21. An optical sensor comprising:
    optical detecting means including a plurality of photodetectors for receiving light and generating detection signals;
    light amount controlling means arranged above said optical detecting means for controlling amounts of said light to said photodetectors in accordance with an incident elevation angle of said light;
    first signal generation means for generating and outputting a first sensor signal including data of an incident elevation angle of said light from a part of said detection signals; and
    second signal generation means for generating and outputting a second sensor signal including data of a total amount of said light from said detection signals; wherein:
        said photodetectors are arranged coaxially; and
        said photodetectors includes a first pair of photodetectors as first right and left photodetectors, a second pair of photodetectors as second right and left photodetectors, and third pair of photodetectors as third right and left photodetectors, said first to third right photodetectors are arranged symmetrically with said first to third left photodetectors respectively regarding a direction on a plane on which said photodetectors are arranged, said first signal generation means includes a first circuit for generating a right side direction sensor signal from at least one of said first to third right photodetectors and a second circuit for generating a left side direction sensor signal from at least one of said first to third left photodetectors, said second signal generation means generates said second sensor signal from said first to third pairs of photodetectors.

22. An optical sensor as claimed in claim 21, wherein said second left and right photodetectors are physically connected.

23. An optical sensor as claimed in claim 21, further comprising weighting means for respectively weighting said first and second sensor signals and outputting first and second weighted detection signals, wherein characteristics of said first and second weighted sensor signals vary in accordance with said incident elevation angle.

24. An optical sensor as claimed in claim 21, said light amount control means includes a first opaque ring arranged just above peripheral portions of said first pair of photodetectors to prevent said light from entering said first pair of photodetectors at a right elevation angle and a second opaque ring arranged just above said third pair of photodetectors to prevent said light from entering said third pair of photodetectors at a right elevation angle.

25. An optical sensor comprising:
    optical detecting means including a plurality of photodetectors for receiving light and generating detection signals;
    light amount controlling means arranged above said optical detecting means for controlling amounts of said light to said photodetectors in accordance with an incident angle of said light; and
    weighting means for respectively weighting sensitivities of said photodetectors and outputting a weighted detection signal from said detection signals, wherein a characteristic of said weighted detection signal varies in accordance with said incident angle; wherein:
        said photodetectors are arranged coaxially; and
        one of said photodetectors arranged closest to the center of said photodetectors is apart from the other photodetectors by a predetermined interval and said weighting means comprises a signal processing circuit arranged between said one of said photodetectors and the other photodetectors.

26. An optical sensor comprising:
    optical detecting means including a plurality of photodetectors for receiving light and generating detection signals;
    light amount controlling means arranged above said optical detecting means for controlling amounts of said light to said photodetectors in accordance with an incident angle of said light; and
    weighting means for respectively weighting sensitivities of said photodetectors and outputting a weighted detection signal from said detection signals, wherein a characteristic of said weighted detection signal varies in accordance with said incident angle; wherein:
        said detection signals of a plurality of said photodetectors are summed to generate a first function signal and are combined to provide a second function signal, said first function signal is provided to control an air conditioner of a vehicle on which said optical sensor is mounted, and said second function signal is provided to control turning on and off of a head lamp unit of said vehicle.

27. An optical sensor comprising:
    optical detecting means including a plurality of photodetectors for receiving light and generating detection signals;
    light amount controlling means arranged above said optical detecting means for controlling amounts of said light to said photodetectors in accordance with an incident angle of said light; and
    weighting means for respectively weighting sensitivities of said photodetectors and outputting a weighted detection signal from said detection signals, wherein a characteristic of said weighted detection signal varies in accordance with said incident angle; wherein:
        said photodetectors are arranged coaxially; and
        said detection signals of a plurality of said photodetectors are summed to generate a first function signal and are combined to provide a second function signal, said first function signal is provided to control an air conditioner of a vehicle mounting said optical sensor, and said second function signal is provided to control turning on and off of a head lamp unit of said vehicle.

* * * * *

UNITED STATES PATENT AND TRADEMARK OFFICE
CERTIFICATE OF CORRECTION

PATENT NO.    : 6,521,882 B1
DATED         : February 18, 2003
INVENTOR(S)   : Kazuyoshi Sumiya et al.

It is certified that error appears in the above-identified patent and that said Letters Patent is hereby corrected as shown below:

<u>Title page,</u>
Item [63], Related U.S. Application Data,
"application No. 09/277,068, filed on Jan. 5, 1999" should be -- now abandoned --

Signed and Sealed this

Thirtieth Day of September, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,521,882 B1
DATED         : February 18, 2003
INVENTOR(S)   : Kazuyoshi Sumiya et al.

It is certified that error appears in the above-identified patent and that said Letters Patent is hereby corrected as shown below:

<u>Title page,</u>
Item [63], Related U.S. Application Data, "Continuation-in-part of Application No. 09/277,068, filed on Jan. 5, 1999, now Patent No. 6,261,946" should be
-- Continuation-in-part of Application No. 09/277,068, filed on March 26, 1999, now abandoned --

This certificate supersedes Certificate of Correction issued September 30, 2003.

Signed and Sealed this

Twenty-seventh Day of January, 2004

JON W. DUDAS
*Acting Director of the United States Patent and Trademark Office*